United States Patent [19]

Favin et al.

[11] 4,417,337
[45] Nov. 22, 1983

[54] ADAPTIVE MULTITONE TRANSMISSION PARAMETER TEST ARRANGEMENT

[75] Inventors: David L. Favin; Peter F. Lynn, both of Little Silver; Paul J. Snyder, Linden, all of N.J.

[73] Assignee: Bell Telephone Laboratories, Incorporated, Murray Hill, N.J.

[21] Appl. No.: 278,884

[22] Filed: Jun. 29, 1981

[51] Int. Cl.³ .............................................. H04B 3/46
[52] U.S. Cl. .................................... 371/22; 364/481; 324/57 DE
[58] Field of Search .................. 371/22; 364/481, 487; 324/57 DE

[56] References Cited

U.S. PATENT DOCUMENTS

| | | | |
|---|---|---|---|
| 3,271,666 | 9/1966 | Anderson et al. | 324/57 DE |
| 3,573,611 | 4/1971 | Bergemann et al. | 324/77 R |
| 3,842,247 | 10/1974 | Anderson | 324/57 DE |
| 3,970,926 | 7/1976 | Rigby et al. | 324/57 DE |
| 4,001,559 | 1/1977 | Osborne et al. | 364/481 |
| 4,039,769 | 8/1977 | Bradley | 324/57 DE |
| 4,264,959 | 4/1981 | Blaäss | 364/487 |
| 4,275,446 | 6/1981 | Blaess | 364/487 |
| 4,301,536 | 11/1981 | Favin et al. | 371/22 |

*Primary Examiner*—David H. Malzahn
*Attorney, Agent, or Firm*—Thomas Stafford

[57] ABSTRACT

Accurate and reliable measurements of transmission parameters, e.g., envelope delay distortion or frequency response, of a network or facility (105) are obtained in a test system (FIG. 1) employing digital data acquisition units (121) by utilizing a unique test signal including a plurality of tones. A set of test signals is transmitted over the facility (105), a set of measurements is made of the received version for each test signal, each set of measurements is time averaged, and an ensemble of time-averaged sets of measurements is used to generate the desired measurements of the transmission parameters. System efficiency is enhanced by measuring prescribed transmission impairments, e.g., nonlinear distortion (3OID), signal-to-noise ratio (S/N) and frequency shift (FS) on the facility under evaluation and dynamically determining test system parameters in accordance with predetermined relationships with the measured impairments (FIGS. 5, 6 and 7), namely, the number (D) of test signals in the set of test signals, the maximum number (T) of consecutive measurements to be time-averaged, the required number of measurements (M) and the number of time-averaged measurements to be made in order to obtain a desired measurement accuracy.

13 Claims, 18 Drawing Figures

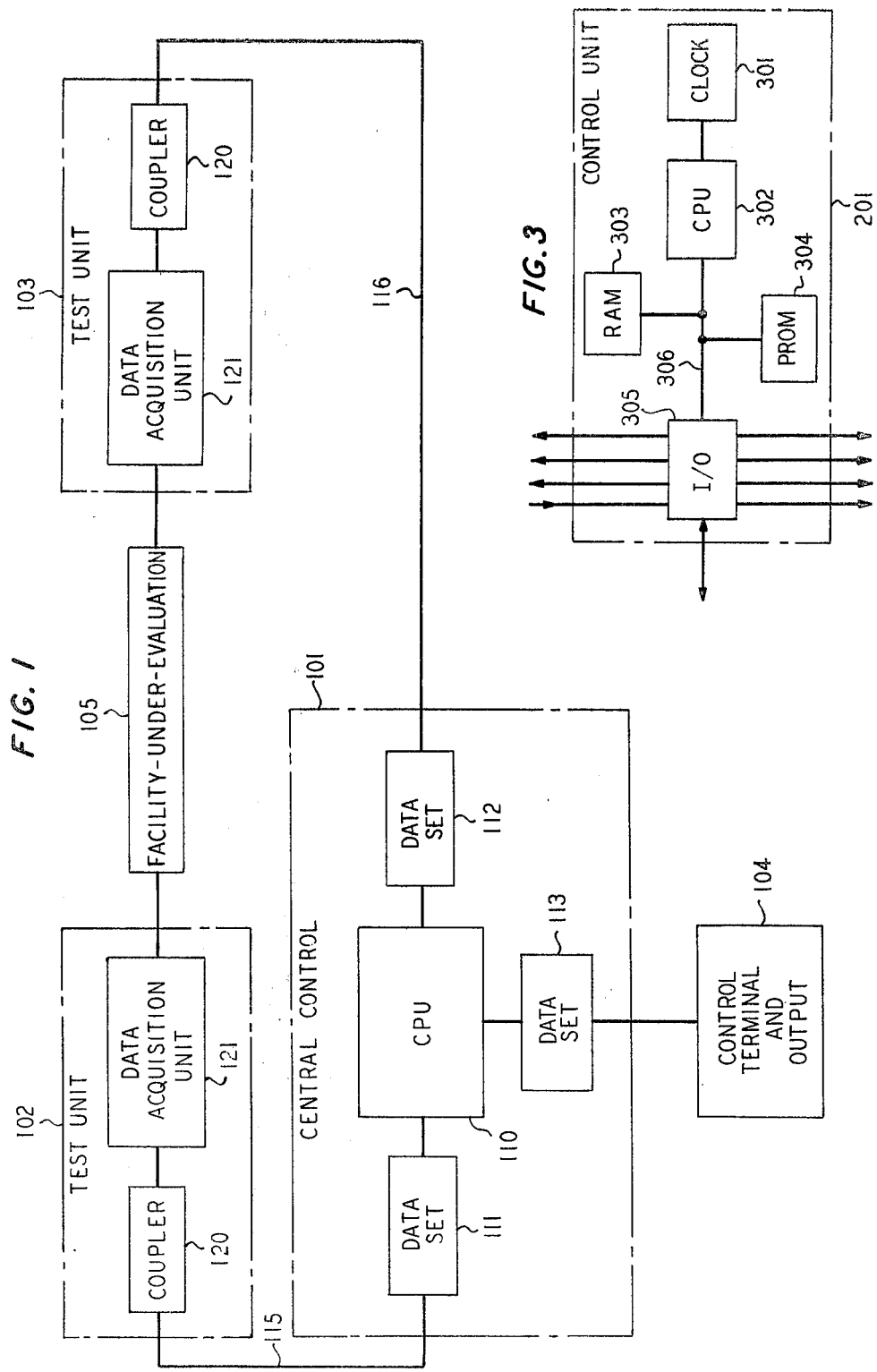

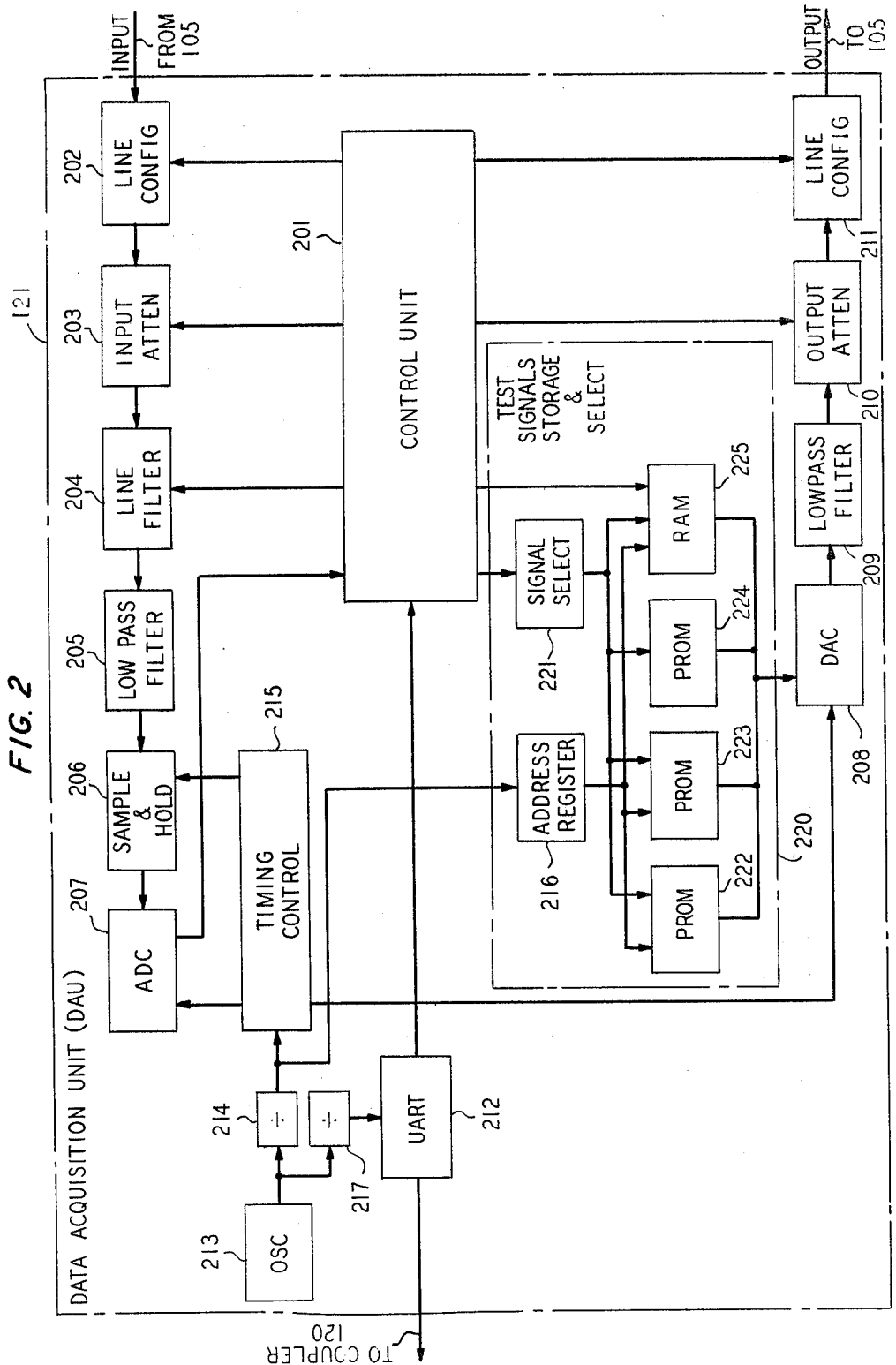

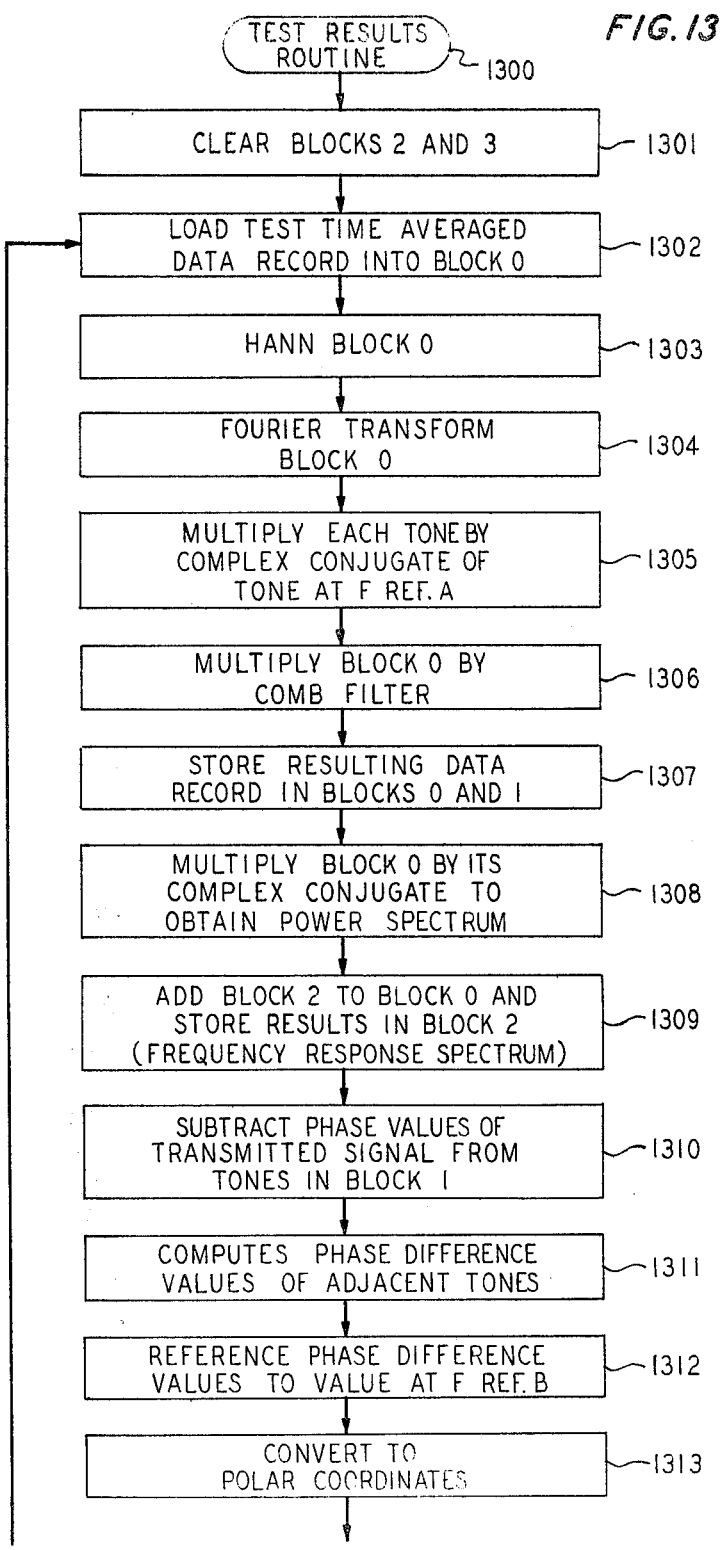

ADAPTIVE MULTITONE TRANSMISSION PARAMETER TEST ARRANGEMENT

TECHNICAL FIELD

This invention relates to measurement of transmission parameters and, more particularly, to the measurement of envelope delay distortion and/or frequency response of networks or facilities.

BACKGROUND OF THE INVENTION

In order to maintain networks or communication systems properly, for example, telephone transmission facilities and the like, numerous measurements are made of network and system parameters. Important among these are the measurements of frequency response and envelope delay distortion. To this end, what is commonly called envelope delay is measured over the frequency range of the facility being evaluated. Envelope delay is defined as the slope of the phase versus frequency characteristic of the transmission facility. In an ideal communications system, envelope delay is constant over the frequency band. However, in practical systems there are deviations in the envelope delay over the frequency band. These deviations from an arbitrary reference are defined as the envelope delay distortion of the facility.

Envelope delay measurements have been attempted employing a test signal including a plurality of tones or tone pairs spaced at predetermined frequencies in the frequency band of interest in order to simultaneously obtain a measure of envelope delay over the entire frequency band for the facility under evaluation, as described in U.S. Pat. No. 3,573,611, issued Apr. 6, 1971.

Problems common to the known prior measurement arrangements are errors in and repetition of measurements of envelope delay distortion of facilities on which noise, frequency shift, nonlinearity or other impairments are present. Moreover, it is important to obtain accurate and reliable measurements in the presence of subtle changes in the amount of intermodulation distortion on the facility under evaluation.

Test arrangements which address the problems of accuracy, reproducibility and reliability of measurements of transmission parameters, e.g., of envelope delay distortion and/or frequency response of a network or facility are described in our copending application, Ser. No. 107,787, filed Dec. 28, 1979 now U.S. Pat. No. 4,301,536, issued Nov. 17, 1981. These test arrangements employ a set of test signals, each test signal having a plurality of tones and each tone having frequency, amplitude and unique phase component values determined and assigned thereto in accordance with prescribed criteria. An ensemble of measurements is made while transmitting the set of test signals over the network or facility under evaluation. In turn, the ensemble of measurements is used to obtain values for envelope delay distortion.

In one measurement procedure employing the set of test signals, measurements are first obtained to determine values of predetermined characteristics of the facility under evaluation, for example, frequency shift and third order intermodulation distortion. Then, depending on the values of frequency shift and third order intermodulation distortion being within at least first, second or third predetermined limits, at least first, second or third predetermined fixed test procedures, respectively, are employed to obtain the desired measurements of frequency response and/or envelope delay distortion. Specifically, if the frequency shift and third order intermodulation distortion products are within the first limits a first test procedure is employed utilizing a set of test signals including one test signal having the plurality of tones and randomly assigned phase component values wherein a first fixed set of measurements is obtained and time-averaged and a first predetermined fixed ensemble of time-averaged sets of measurements is employed to obtain the desired measurements. If the frequency shift and third order intermodulation distortion values are within second predetermined limits, a second test procedure is employed utilizing a set of test signals identical to the first test procedure wherein a second fixed set of measurements is obtained and time-averaged and a second predetermined fixed ensemble of time-averaged sets of measurements is employed to obtain the desired measurements. If the frequency shift and third order intermodulation distortion values are within third predetermined limits, a third test procedure is employed utilizing a set of signals including a plurality of test signals each including the plurality of tones. Similarly, phase values are assigned to the tones on a random basis. After each transmission of a test signal, the phase component values are reassigned to the tones in accordance with a prescribed criterion. In this example, the phase component values are reassigned to the tones on a one-to-one basis in counterclockwise, circular fashion until each tone has taken on each phase component value. During individual test signal transmissions, a predetermined fixed set of measurements are obtained and time-averaged. Thereafter, the fixed ensemble of time-averaged sets of measurements is employed to obtain the desired measurement of envelope delay distortion. Once the ensemble of time-averaged sets of measurements of the test signals has been made, each time-averaged set in the ensemble is Fourier transformed to the frequency domain and the resulting spectrum is utilized to obtain the desired envelope delay distortion or frequency response measurement in accordance with predetermined procedures.

Although providing satisfactory results for some measurements, the prior fixed test procedures are not optimized for the specific impairments, e.g., noise, intermodulation distortion and frequency shift, of the network or facility being evaluated and may inefficiently use the system resources.

SUMMARY OF THE INVENTION

More efficient use of system resources is realized in a transmission test arrangement employing a test signal including a plurality of tones by first measuring prescribed impairments of a network or facility under evaluation and, then, dynamically determining in accordance with predetermined relationships with the measured impairments, test system parameters to be employed in making a measurement. Specifically, a dynamic determination is made of the number of test signals in a set to be transmitted over the network or facility, a required number of measurements (data records), the maximum number of consecutive measurements of a received test signal to be time averaged and the number of time-averaged measurements which must be used in order to obtain a desired accuracy in generating measurements of prescribed transmission parameters of the network or facility under evaluation, e.g., frequency response and/or envelope delay distortion.

In a specific embodiment of the invention the number of different test signals required to obtain an accurate measurement is further minimized by obtaining and utilizing a plurality of time-averaged measurements for each test signal. The number of time-averaged measurements is also determined dynamically in accordance with predetermined relationships with the measured impairments.

BRIEF DESCRIPTION OF THE DRAWING

The invention will be more fully understood from the following detailed description of an illustrative embodiment taken in connection with the appended figures in which:

FIG. 1 shows in simplified block diagram form an arrangement including an embodiment of the invention for obtaining measurements of prescribed transmission parameters in accordance with an aspect of the invention;

FIG. 2 depicts in simplified block diagram form details of a data acquisition unit employed in the test units of FIG. 1;

FIG. 3 illustrates in simplified block diagram form details of a control unit employed in the data acquisition unit shown in FIG. 2;

FIGS. 13 and 14 when assembled as shown in FIG. 15 form a flowchart of the test results routine employed for tests 1, 2, and 3.

DETAILED DESCRIPTION

Figure 4:
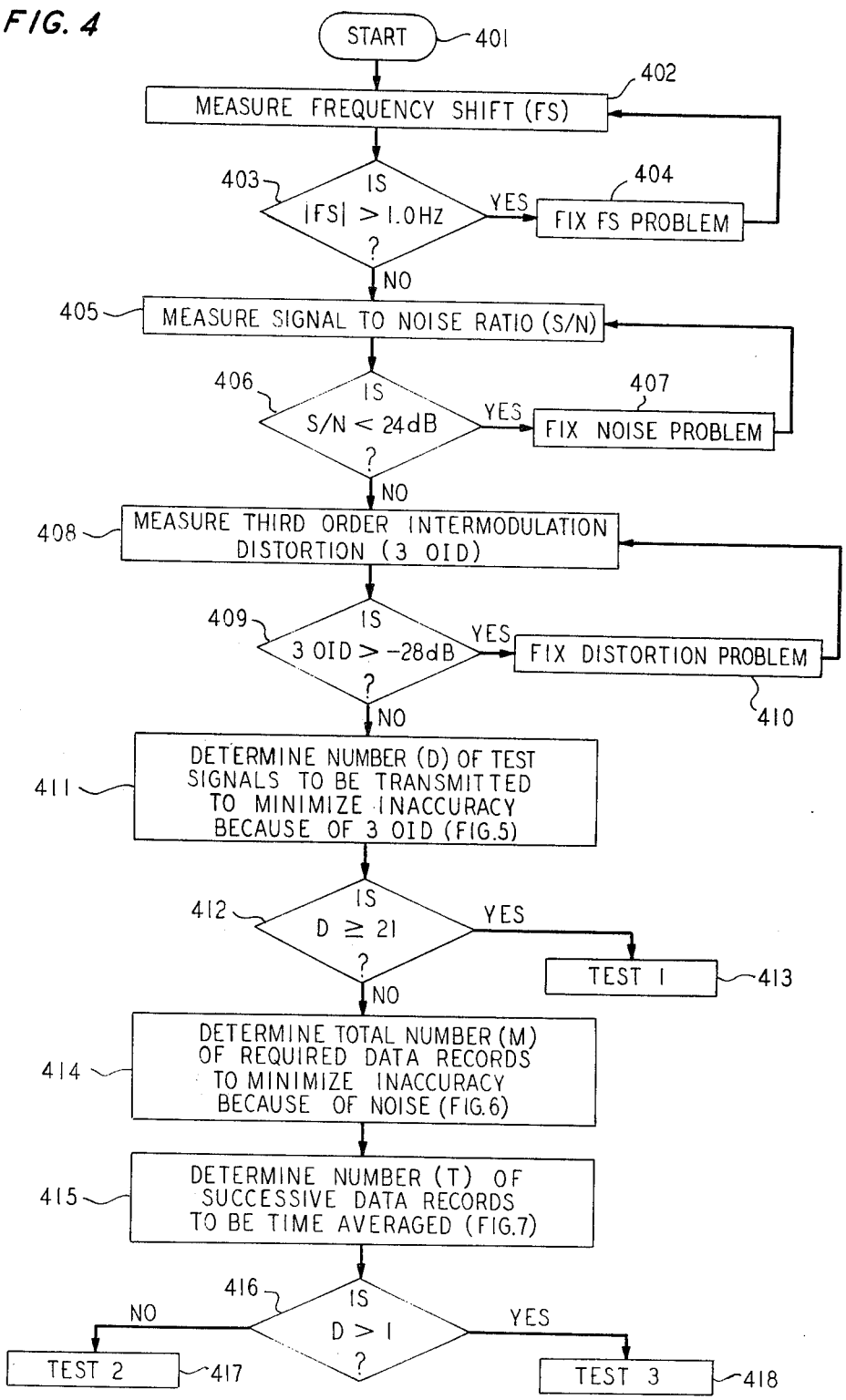
FIG. 4 is a flowchart of a procedure including steps employed in one embodiment of the invention for obtaining measurements of prescribed transmission parameters, e.g., frequency response and envelope delay distortion of a facility under evaluation.

FIG. 1 shows in simplified block diagram form a system arrangement which is advantageously utilized to make frequency response and/or envelope delay distortion measurements in accordance with one embodiment of the invention. Accordingly, shown is central control 101, first remote test unit 102, second remote test unit 103, control terminal and output unit 104 and facility under evaluation 105. Test units 102 and 103 are adapted for being connected to facility under evaluation 105 and to central control 101. Facility 105 may be a communications link, for example, a voice frequency telephone line, or the like.

Central control 101 includes, in this embodiment, computer 110, data set 111 for transmitting and receiving information in digital form to and from, respectively, test unit 102, data set 112 for transmitting and receiving information in digital form to and from, respectively, test unit 103 and data set 113 for transmitting and receiving information in digital form to and from, respectively, control terminal 104.

Computer 110 may be any of the general purpose computers known in the art and includes associated core and disc memory units. Preferably, computer 110 includes a 2100S series Hewlett-Packard (H-P) computer which contains in memory a 5451B Fourier Analyzer Software System commercially available from Hewlett-Packard. Operation of the 2100 series Hewlett-Packard Computer is described in Hewlett-Packard Computer Reference Manual No. 02100-90001 dated Dec. 1, 1971, and also in H-P Installation and Maintenance Manual No. 02100-90002 dated April 1973. The disc memory unit, which in this example is an H-P 7900A (not shown), is described in the H-P Disc 7900A Disc Drive Operating and Service Manual No. 07900-9002. Similarly, the 5451B software is described in Fourier Analyzer System 5451B Manual No. 05451-90199 dated August 1974, with Supplements No. 05451-90268 dated March 1975 and No. 05451-90411 dated May 1976. For subroutines available in the 5451B system and their use, also see "Hewlett-Packard Fourier Analyzer Training Manual—Application Note 140-0" and the "Fourier Analyzer 5451B Keyboard Command Manual," dated October 1973.

Data sets 111 and 112 are identical. In this example, they are 202C type data sets which transmit and receive at 1200 baud. Similarly, data set 113 is, in this example, a 103 type data set which transmits and receives at 300 baud.

Control terminal and output unit 104, in this example, is a Texas Instruments Model 745 Terminal. The individual program routines in the 5451B Fourier Analyzer Software System are initiated by commands entered on terminal 104 keyboard as described in the above noted "Keyboard Command Manual," or, alternatively, by programs stored on the disc memory and retrieved under control of an operating system program.

Thus, as shown, central control 101 is adapted to be connected via communications facilities 115 and 116 to test units 102 and 103, respectively. Facilities 115 and 116 may be, for example, Direct Distance Dialing (DDD) communications facilities.

Test units 102 and 103 are identical, both including coupler 120 and data acquisition unit 121. Coupler 120 is an acoustically coupled modem, and is employed to acoustically couple test units 102 and 103 via DDD facilities 115 and 116 to central control 101.

At the outset, it should be noted that it is contemplated and anticipated that in other applications, and/or embodiments of the invention, the functions of central control 101 be included in remote test units 102 and 103, thereby eliminating the need for central control 101. In such an arrangement the intelligence of central control 101 would have to be included in the remote test units via additional processing and memory capability. Additionally, other embodiments of the invention may include hardware signal generators and receivers.

FIG. 2 shows in simplified block diagram form details of data acquisition unit (DAU) 121. Accordingly, shown is control unit 201, which is a microcomputer system as shown in FIG. 3 and described below. Control unit 201 is employed to control the configuration and operation of DAU 121 for transmitting and receiving information to and from, respectively, facility under evaluation 105 and central control 101.

DAU 121 has an input adapted to be connected to network or facility under evaluation 105 and an output also adapted to be connected to facility 105, both under control of control unit 201 in response to commands from central control 101.

An input or receive section of DAU 121 includes line configuration unit 202, input attenuator 203, line filter 204, low pass filter 205, sample and hold 206 and analog-to-digital converter (ADC) 207.

Similarly, an output or transmit section of DAU 121 includes digital-to-analog converter (DAC) 208, low pass filter 209, output attenuator 210 and line configuration unit 211.

Signals are supplied from and to unit 121 via universal asynchronous receiver transmitter (UART) 212 and coupler 120 to and from, respectively, central control 101.

Oscillator 213 in conjunction with divider 214 generates a first timing signal which is supplied to timing control 215 and address register 216. In this example, the first timing signal is the digital sampling rate and is 8 kHz. Similarly, oscillator 213 in conjunction with divider 217 generates a second timing signal for driving UART 212, in this example, 19.1 kHz.

Timing control 215 includes a plurality of timing circuits (not shown), for example, monostable circuits connected in tandem to generate a desired sequence of pulse signals for controlling sample and hold 206, ADC 207 and DAC 208. In this example, an incoming analog test signal is sampled prior to being converted to digital form.

Line configuration units 202 and 211 are identical and are employed under control of unit 201 to select input and output impedance values, respectively, in this example, either 600 ohms or 900 ohms.

Input attenuator 203 includes a plurality of programmable attenuators (not shown) capable of inserting under control of unit 201 attenuation in prescribed steps into the input channel of DAU 121. In an example from experimental practice, 3 dB attenuation steps are employed.

Output attenuator 210 is essentially identical to input attenuator 203, except that the attenuation adjustment in this example is in 1 dB steps.

Line filter 204 is selected under control of control unit 201, depending on the specific type of test being run; in this example, filter 204 is of a type having a flat amplitude versus frequency characteristic over the voice frequency band, e.g., from DC through 3600 Hz.

Low pass filters 205 and 209 are identical and are active resistor-capacitor active filters forming an 8 pole, low pass filter configuration described in U.S. Pat. No. 3,919,658.

Sample and hold 206 is employed to controllably sample a received analog signal.

The sampled signal held in sample and hold 206 is converted into digital form via ADC 207. In this example, the analog signal sample is converted into a 12 bit digital signal.

As indicated above, timing control 215 generates signals at the 8 kHz rate for operating sample and hold 206 prior to the digital conversion in ADC 207.

DAC 208 is a 12 bit digital-to-analog converter for converting 12-bit digital signals from test signal storage and select circuit 220 into an analog test signal.

Test signal storage and select circuit 220 includes address register 216, signal select circuit 221, programmable read-only memories (PROMs) 222, 223 and 224 and read-write memory, commonly referred to as RAM 225. It is anticipated that in commerical use the PROMs will be replaced by ROMs and that additional memory units may be employed, depending on the type and number of test signals to be generated. Although shown as single units, each of PROMs 222 through 224 includes two 8-bit PROM units, each used to store 6-bit words, thereby forming 12-bit memory units. Similarly, RAM 225 is also a 12-bit storage arrangement. RAM 225 is intended for use in storing any test signal to be supplied from central control 101 (FIG. 1).

Address register 216, in response to the second timing signal from divider 214 (8 kHz), continuously generates a sequence of addresses corresponding to the addresses of buffer stages in PROMs 222, 223 and 224 and RAM 225 in well-known fashion. Thus, the buffer stages of a selected PROM or RAM memory unit are continuously sequenced through.

Signal select unit 221 includes a binary coded decimal to decimal decoder unit (not shown) which, under control of control unit 201, selects a particular one of PROMs 222, 223 or 224 or RAM 225 to be employed for generating a specific test signal. Digital outputs from PROMs 222, 223 and 224 and RAM 225 are supplied to DAC 208 for conversion into an analog test signal.

In this example, PROMs 222 and 223 are employed to store digital representations of test signals intended to be employed for obtaining a measure of intermodulation distortion of facility 105 as described in our U.S. Pat. No. 4,273,970. To this end, PROM 222 stores digital representations of signal amplitudes for generating, in conjunction with DAC 208 and low pass filter 209, an analog single frequency test signal. This single frequency signal is employed in this embodiment of the invention, as will be discussed below, to obtain a measure of frequency shift. Additionally, the single frequency signal is used to measure noise which is applied to the intermodulation distortion measurement in a compensating manner and used in this embodiment of the invention as discussed below. In an example from experimental practice, a test frequency of 1015.625 Hz corresponding to channel 65 is employed for this purpose. Hereinafter, this signal shall be referred to as 1016 Hz. In the instant example, frequency separation between channels is 15.625 Hz. The usual 1,000 Hz test tone widely employed in telephone systems cannot be utilized for the noise and frequency shift tests because it is a subharmonic of the T-carrier sampling rate.

PROM 223 stores digital representations of signal amplitudes for generating, in conjunction with DAC 208 and low pass filter 209, a test signal having three tones used in obtaining a measure of intermodulation distortion. However, the measure of intermodulation distortion may be obtained by employing other known apparatus, for example, the arrangement disclosed in U.S. Pat. No. 3,862,380.

Applicants' unique set of test signals includes at least one test signal having a plurality of predetermined tones, each having a predetermined amplitude, frequency and unique phase determined by prescribed criteria to minimize the effect of distortion and nonlinearities on the actual frequency response and envelope delay distortion measurements as described in U.S. Patent Application, Ser. No. 107,787 filed Dec. 28, 1979 now U.S. Pat. No. 4,301,536, issued Nov. 17, 1981.

In an example from experimental practice, a test signal having N=21 tones is employed. However, in other applications a larger or smaller number of tones may equally be employed. Moreover, phase component values to be assigned to the tones can be selected from any desired probability density function. In this example, individual phase values ($\phi$) are determined by $\phi n = (360/N)(n)$, where, in this example, N=21 and n is the number of the individual tone, namely, 1 through 21. Although phase values may be assigned in any consistent manner, it is preferred that the individual phase values $\phi n$ are initially assigned to the individual tones on a one-to-one basis in accordance with a random selection procedure. This is important so that the test signal has a relatively low crest factor (peak-to-root mean-square ratio) similar to a white noise signal. In an example from experimental practice not intended to limit the scope of the invention, the tone frequencies are from 203.125 Hz to 3328.125 Hz at a spacing of 156.25 Hz. Thus, T1=203.125 Hz, T2=359.375 Hz, and so on, to T21=3328.125 Hz. Applicants, by advantageously selecting the tone frequencies, are able to use a single set of test signals to measure both frequency response and envelope delay distortion.

It should be recognized, assuming the above signal to noise ratio conditions, that when the test signal experiences frequency shift on the network or facility under evaluation, the received test signal is no longer periodic with respect to the sampling interval. This lack of periodicity when taking a long term average would yield a zero result. Thus, a number of data records in a set that can be time-averaged in the presence of frequency shift is limited by the measurement accuracy desired. However, it is desirable to take a large number of data records to reduce variance in the test results caused by noise in the test signal and third order intermodulation distortion of network or facility 105. As indicated above, the number of data records in a set is limited by frequency shift. A trade-off exists in the presence of frequency shift in the number of data records time-averaged per set. Consequently, the number of successively obtained sets in an ensemble is adjusted in a manner corresponding to the adjustment in the number of measurements in a set to minimize the effect of the noise. Ideally, the total number of data records taken in an ensemble should be constant; however, deviation from the ideal occurs in practical systems. In the arrangement described in the application Ser. No. 107,787, filed Dec. 28, 1979 applicants employ one of a plurality of fixed test procedures to obtain measurements of frequency response and/or envelope delay distortion, depending on the amount of frequency shift (FS) and third order intermodulation distortion products on facility 105. In this embodiment of the invention, the number of test signals to be transmitted (D), the number of successive measurements (T) to be time-averaged and the number of time-averaged measurements (M) to be utilized are dynamically determined in accordance with predetermined relationships with the measured impairments of network or facility 105, namely, frequency shift, signal-to-noise ratio and third order intermodulation distortion.

Figure 5:
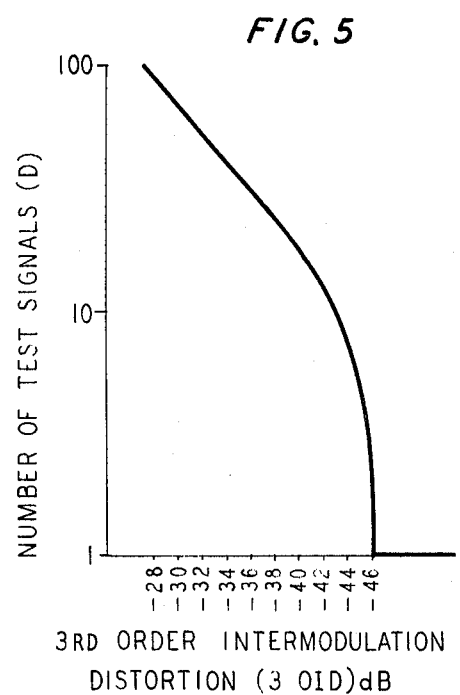
FIG. 5 is a graphic representation of the relationship between the number of test signals (D) and third order intermodulation distortion (3-OID) employed in the procedure of FIG. 4.
Figure 6:
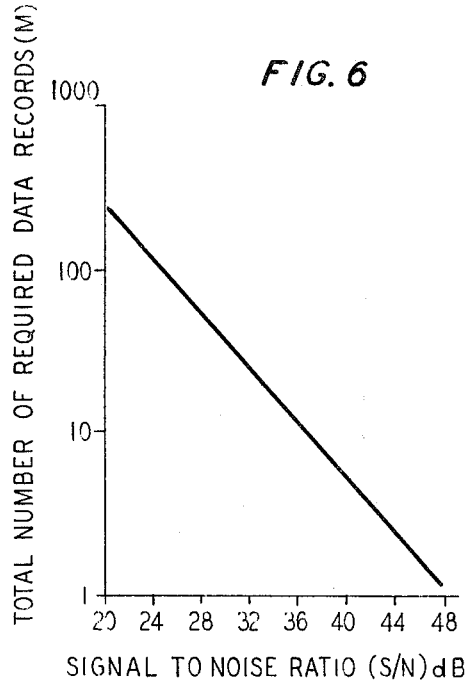
FIG. 6 is a graphic representation of the relationship between the total number of required data records (M) and signal to noise ratio (S/N)
Figure 7:
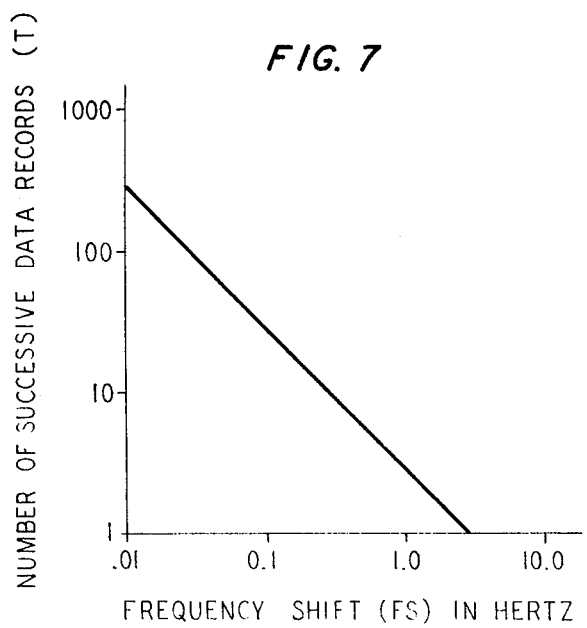
FIG. 7 is a graphic representation of the relationship between the number of successive measurements, i.e., data records (T) to be taken and frequency shift (FS)

A plurality of test procedures are employed in this embodiment of the invention to efficiently utilize system resources in obtaining accurate measurement of the desired transmission parameter, e.g., frequency response and envelope delay distortion. However, the number (D) of test signals to be transmitted over network or facility 105, the number (T) of successive measurements of a received signal after transmission over network or facility 105, e.g., data records to be time-averaged and the number (M) of time-averaged data records employed in obtaining the desired measurements are dynamically determining in accordance with the predetermined relationships of impairment measurements e.g., third order intermodulation, envelope delay distortion, signal-to-noise ratio and frequency shift experienced on network or facility 105 as graphically represented in FIGS. 5, 6 and 7, respectively.

Digital representations of the single tone test signal, the three tone test signal and a 21 tone test signal are generated in well-known fashion for storage in PROM 222, PROM 223 and PROM 224, respectively. Similarly, digital representations of the 21-tone signals to be transmitted to RAM 225 are also generated in well-known fashion. In this example, the digital signal representations stored in PROM and/or RAM memory are optimized for the specific unit employed for DAC 208. An 8 kHz sampling rate and 512 twelve bit samples per "record" are employed. This allows for generation of time signals containing one or more frequencies in the 15.625 Hz to 4 kHz in 15.625 Hz increments. Twelve bit samples are generated which are separated into two parts, namely, 6 least significant bits and 6 most significant bits. Each test signal is normalized to a reference signal containing a single tone to maximize output power from DAC 208 and at the same time differs from the reference signal power by integer dB values. Output attenuator 210 then corrects for the different power levels and provides for transmitting specified power levels in the integer steps, for example, of 1 dB.

Digital representations corresponding to signal amplitude samples to be stored are readily obtained knowing: (1) the number of tones (1 to 256) in the signal; (2) the channel number of the reference frequency; and (3) the peak amplitude (volts), frequency channel, and phase (degrees) for each tone. In this example, a channel number of a tone (1 to 256) is equal to the frequency in hertz divided by the frequency resolution (15.625 Hz).

Maximum output power for a signal that contains only the reference frequency is obtained, taking into account the aperture distortion of zero-order hold DAC 208, as described in the application, Ser. No. 107,787 filed Dec. 28, 1979, now U.S. Pat. No. 4,301,536, issued Nov. 17, 1981.

Quantized values for the tones are rounded off to the nearest 4-digit integer and converted to a 4-digit octal word which is then separated into two parts, one part representing the 6 least significant bits (LSB) and the other part representing the 6 most significant bits (MSB) of each 12 bit word. The resultant 12 bit words are stored in buffers of a corresponding one of PROMS 222–224 or RAM 225 for use later in generating desired test signals.

FIG. 3 shows in simplified block diagram form details of control unit 201. Accordingly, shown are clock 301, central processing unit (CPU) 302, read-write memory, commonly called RAM 303, programmable read only memory (PROM) 304, and input/output (I/O) 305. Clock 301 generates timing signals for CPU 302 in well-known fashion. CPU 302, RAM 303, PROM 304 and I/O 305 are interconnected via bus 306 to form a microcomputer system. CPU 302 may be any of numerous computer arrangements known in the art. In this example, an Intel 8080A unit is utilized with associated compatible circuit elements. The 8080A, its operation and programming are described in "Intel 8080 Microcomputer Systems Users Manual," dated September 1975. It should be noted that microcomputer arrangements, including the desired configuration of control unit 201, are available as a single unit, for example, the Intel 8741.

A program is stored in PROM 304 of control unit 201 for controlling operation of data acquisition unit 121 and, hence, test units 102 or 103 in response to commands from central control 101. Thus, control unit 201 accepts commands supplied from central control 101 via coupler 120 and UART 212, decodes and executes the commands. A list of preferable commands are set out below. The specific procedure for decoding and executing the commands will be apparent to those skilled in the art.

Briefly, when either test unit 102 or 103 is functioning as a receiver, control unit 201, in response to appropriate commands, connects the input port of DAU 121 to facility 105, sets line configuration 202 to a proper impedance or termination, adjusts input attenuator 203 to a desired or specific value, sets line filter 204 to a specific filter configuration and stores in RAM 303 (FIG. 3) 512 twelve-bit digital representations designated a record of a received test signal. The running average of data records is stored in RAM 303, the number of data records being dynamically determined in accordance with the values of the impairments measured on network or facility 105. The individual time averaged records are thereafter transmitted to central control 101 via UART 212 and coupler 120 (FIG. 1) for use in obtaining a test result in a manner to be described below. Similarly, when either test unit 102 or 103 is used as a transmitter, control unit 201, in response to appropriate commands from central control 101 connects the output port of DAU 121 to facility 105, sets line configuration 211 to a desired impedance or termination, adjusts output attenuator 210 to a desired value and causes 512 twelve-bit test signal samples to be supplied in sequence from test signal storage and select circuit 220 to DAC 208 for generating a corresponding analog test signal. Depending on the particular test being performed, each test unit can be operating as either a receiver or a transmitter.

A list of typical commands for test units 102 and 103, including the characters, are shown below. An "x" adjacent to the command indicates type of command, immediate or string; and number of characters, i.e., 1 or 2. In this example, the commands are in ASCII code. Specifically, U.S.A. Standard ASCII code is employed and, then, only these characters included in the so-called "dense" ASCII set.

| COMMAND | TYPE COMMAND IMMEDIATE | TYPE COMMAND STRING | CHARACTERS IN COMMAND 1 | CHARACTERS IN COMMAND 2 | CHARACTERS 1st | CHARACTERS 2nd |
|---|---|---|---|---|---|---|
| ATTENTION | x | | x | | ∅ | |
| SELF TEST | x | | x | | 1 | |
| SEND SAMPLES | x | | x | | 2 | |
| STOP GENERATOR | x | | x | | 3 | |
| RETRANSMIT STATUS | x | | x | | 4 | |
| END I/O | x | | x | | 5 | |
| LOAD TRANSMIT BUFFER | x | | | x | 6 | Binary ∅ Binary 1 |
| START STRING | x | | | x | 7 | Binary 1 thru 10 |
| STRING ENABLE | x | | | x | 8 | Binary ∅ thru 9 |
| START I/O | x | | | x | (A) | Binary ∅ thru 9 |
| ADC RANGE | | x | x | | A | |
| DELAY | | x | | x | D | Binary 1 thru 63 |
| END STRING | | x | x | | E | |
| FILTER | | x | | x | F | Binary ∅ or 1 |
| GENERATE | | x | | x | G | Binary ∅ thru 63 |
| INPUT ATTN | | x | | x | I | Binary ∅ thru 15 |
| LINE CONFIGURATION | | x | | x | L | 6-Bit Byte |
| OUTPUT ATTN | | x | | x | O | Binary ∅ thru 5∅ |
| SAMPLE | | x | | x | S | Binary 1 thru 16 |
| WAVEFORM SELECT | | x | | x | W | Binary ∅ Binary 1 Binary 2 |

A detailed description of the immediate commands follows:

Attention ($\phi$) is a 1-character command that causes test unit 102 or 103 to generate audio and visual signals informing an operator to contact central control 101.

Self Test (1) is a 1-character command that initiates a sequence of self-test procedures for test unit 102 or 103 and transmits the self-test status to central control 101.

Send Samples (2) is a 1-character command that instructs test unit 102 or 103 to transmit data samples (records) from RAM 303 to central control 101.

Stop Generator (3) is a 1-character command that instructs test unit 102 or 103 to disable its transmitter.

Retransmit Status (4) is a 1-character command that instructs test unit 102 or 103 to transmit the current data status information to central control 101. It provides for resending the "data status" response for the case where it is received with errors or is not received at all. This could prevent the need for resending all of the data samples, which is time-consuming.

End I/O (5) is a 1-character command that terminates all communication with test unit 102 or 103. Communication is re-established when test unit 102 or 103 receives a valid "start I/O" command.

Load Transmit Buffer (6+From Where) is a 2-character command. The first character is a 6; the second character instructs test unit 102 or 103 to load data into the transmit buffer, i.e., RAM 225, from modem 120 (binary ∅) or from RAM 303 (binary 1).

Start String (7+String Number) is a 2-character command that instructs test unit 102 or 103 that, following this command, a series of commands will be sent that are to be stored in RAM 303. The second character of the command represents the string identification, A through E, using binary 1 through binary 5, respectively.

String Enable (8+String Number) is a 2-character command that instructs test unit 102 or 103 to execute the string program represented by the second character of the command. Programs A through E correspond to binary 1 through binary 5, respectively.

Start I/O (Control A+Address) is a 2-character command that informs test unit 102 or 103, having an address given in the second character of the command, to expect more commands from central control 101. The second character of the command can be a binary number from zero to nine. This number corresponds to the decimal number selected by a rotary switch on the front panel of test unit 102 or 103. When a valid "start I/O" command is received, test unit 102 or 103 performs initialization procedures that prepare test unit 102 or 103 to accept data or commands from central control 101. The "start I/O" command cannot interrupt the operation of a string program or the loading of data. Central control 101 must wait until these operations are complete before sending this command. The signal generator is disabled if it happens to be generating when the "start I/O" command is received by test unit 102 or 103.

A detailed description of string commands follows:

ADC Range (A) is a 1-character command that instructs test unit 102 or 103 to auto-range its input attenuators for an optimum signal level for analog-to-digital conversion.

Delay (D+N Records) is a 2-character command that instructs test unit 102 or 103 to generate a time delay equal to the integer number N record lengths. The value of N can range from 1 to 63 and is coded in a 6-bit byte having binary values from 1 to 63, respectively.

End String (E) is a 1-character command that is recognized by test unit 102 or 103 as the string sequence terminator.

Filter-Select (F+Which One) is a 2-character command that instructs test unit 102 or 103 to select one of two line filters. Line filter 204 is coded in the 6-bit byte of the second character. Filter 204 in this example has a loss equal to the flat loss of filter 205 and is selected by the second character being binary ∅.

Generate (G+N Times) is a 2-character command that instructs the transmitter to generate N repetitions (records), of the waveform selected, with DAC 208 and then stop. If N is zero, the transmitter will continue to generate until told to stop by the "stop generator" command. The value of N can range from 0 to 63 and is coded in a 6-bit byte, having binary values from 0 to 63, respectively. When the "generate" command is being executed as part of a string program, the number of repetitions N are externally controlled from control 201 of test unit 102 or 103 so that control 201 is free to do other chores. The "start I/O" command, as well as the "stop generator" command, will stop the generator.

Input Attenuator (I+Attenuation) is a 2-character command that instructs test unit 102 or 103 to set input attenuator 203 to a fixed value, in 3 dB increments. The second character of the command specifies the input attenuator settings with a 6-bit byte. Input attenuator settings corresponding to values from 0 dB to 45 dB, in 3 dB increments, are represented with binary values from 0 to 15, respectively.

Line Configuration (L+Type Configuration) is a 2-character command that instructs test unit 102 or 103 to set its terminal conditions in accordance with the bit values of a 6-bit byte of the second character.

| Bit Position | Bit Value | Function |
| --- | --- | --- |
| 1 | ∅ | Normal. |
|   | 1 | Connect Transmitter to Receive Terminals and Receiver to Transmit Terminals. |
| 2 | ∅ | Provide 600 ohm Transmit and Receive Impedance. |
|   | 1 | Provide 900 ohm Transmit β Receive Impedance. |
| 3 | ∅ | Normal. |
|   | 1 | Loop Line - Connect Transmit Line to Receive Line (through input amplifier and output attenuator). |
| 4 | ∅ | Normal. |
|   | 1 | Loop Set - Connect Transmitter Output to Receiver Input. |
| 5 | ∅ | Normal. |
|   | 1 | Connect Receiver Input for Noise to Ground Measurements. |
| 6 | ∅ | Provide for Terminating Impedance at Receiver Input. |
|   | 1 | Provide for DC Measurements at Receiver Input. |

Output Attenuator (O+Attenuation) is a 2-character command that instructs the transmitter to set output attenuator 210. Output attenuator 210 has a range from 0 to 50 dB, in 1 dB steps. The second character of the output attenuator command specifies the output attenuation with a 6-bit byte. Output attenuation values from 0 to 50 dB are represented by consecutive binary values from 0 to 50, respectively.

Sample (S+Y Records) is a 2-character command that instructs test unit 102 or 103 to sample Y successive records. Corresponding sampled values in each record are added together algebraically and averaged. The value of Y can be any number from 1 to 16 and is coded in a 6-bit byte having binary values from 1 to 16, respectively. Each sampled value is checked for an overload condition during sampling.

Waveform Select (W+Which Waveform) is a 2-character command that instructs test unit 102 or 103 to select one of four different waveforms according to the value of the second character which represents a 6-bit byte having a value of binary 0, 1, 2 or 3, namely, signal in RAM 225, 1016 Hz, 3-tone or 21-tone, respectively.

Several modes of testing are possible at and between test units 102 and 103, namely, straightaway measurements from one test unit to the other, loop test unit measurements where the transmit and receiver circuits of a unit are interconnected through a circuit (not shown) in DAU121, loopback measurements where the transmit port and receive port of a single test unit are connected through an external network and loop line measurements where, for example, a 4-wire facility is looped at the far end by a circuit (not shown) in the far end test unit.

FIG. 4 shows in flowchart form applicants' unique test procedure in which data is obtained via test units 102 and 103 under control of central control 101 to generate desired measurements of transmission parameters, e.g., frequency response and envelope delay distortion of facility 105. Three different symbols are shown: oval symbols indicate the beginning and ending of the routine; rectangular symbols, commonly referred to as operational blocks, contain the description of a particular operational step; and diamond symbols, commonly referred to as conditional branch points, contain a description of a test performed to determine the next operation to be performed.

The test procedure is entered by oval 401.

Operational block 402 controls the system of FIG. 1 to obtain a measurement of frequency shift (FS) on facility 105. This measurement may be obtained by any one of a number of well-known manners, e.g., as described in our copending application, Ser. No. 107,787 now U.S. Pat. No. 4,301,536.

Conditional branch point 403 tests the value of FS to determine if it is greater than a predetermined value, in this example, $|FS| > 1.0$ Hz. If the test result is "yes", control is transfered to operational block 404 and the FS problem must be corrected before proceeding. Upon correction of the problem, control is returned to operational block 402. If the test result is "no", frequency shift is within acceptable limits and control is transferred to operational block 405.

Operational block 405 controls the system of FIG. 1 to obtain a measurement of signal-to-noise ratio (S/N) of facility 105. Again, the S/N measurement may be obtained utilizing any number of known procedures. This measurement may be made using the noise procedure outlined in our U.S. Pat. No. 4,273,970.

Operational block 406 tests the value of S/N to determine if it is less than a predetermined value, in this example, S/N < 24 dB. If the test result is "yes", control is transferred to operational block 407 and the noise problem of facility 105 must be corrected before proceeding. Upon correction of the problem, control is again transferred to Operational Block 405. If the test result is "no", control is transferred to operational block 408.

Operational block 408 causes the system of FIG. 1 to obtain a measure of third order intermodulation distortion on facility 105. This measurement of intermodulation distortion will be typically made as a separate test, also described in our U.S. Pat. No. 4,273,970, noted above. Thus, in practice, the values of third order intermodulation distortion, noise and frequency shift are already in memory.

Conditional branch point 409 tests the value of 3OID to determine if it is greater than a predetermined value, in this example 3OID > −28 db. If the test result is "yes", control is transferred to operational block 410 and the distortion problem must be corrected before proceeding. Upon correction of the distortion problem, control is again transferred to operational block 408. If the test result is "no", control is transferred to operational block 411.

Operational block 411 controls the system of FIG. 1 to determine the number (D) of test signals to be transmitted over facility 105 in order to minimize inaccuracies in measurements of the desired transmission parameter because of nonlinear distortion. Typically, this is achieved by storing the information graphically represented in FIG. 5 in memory and using a simple look-up table routine. The number of test signals D needed is rounded up to the next integer value.

Figure 8:
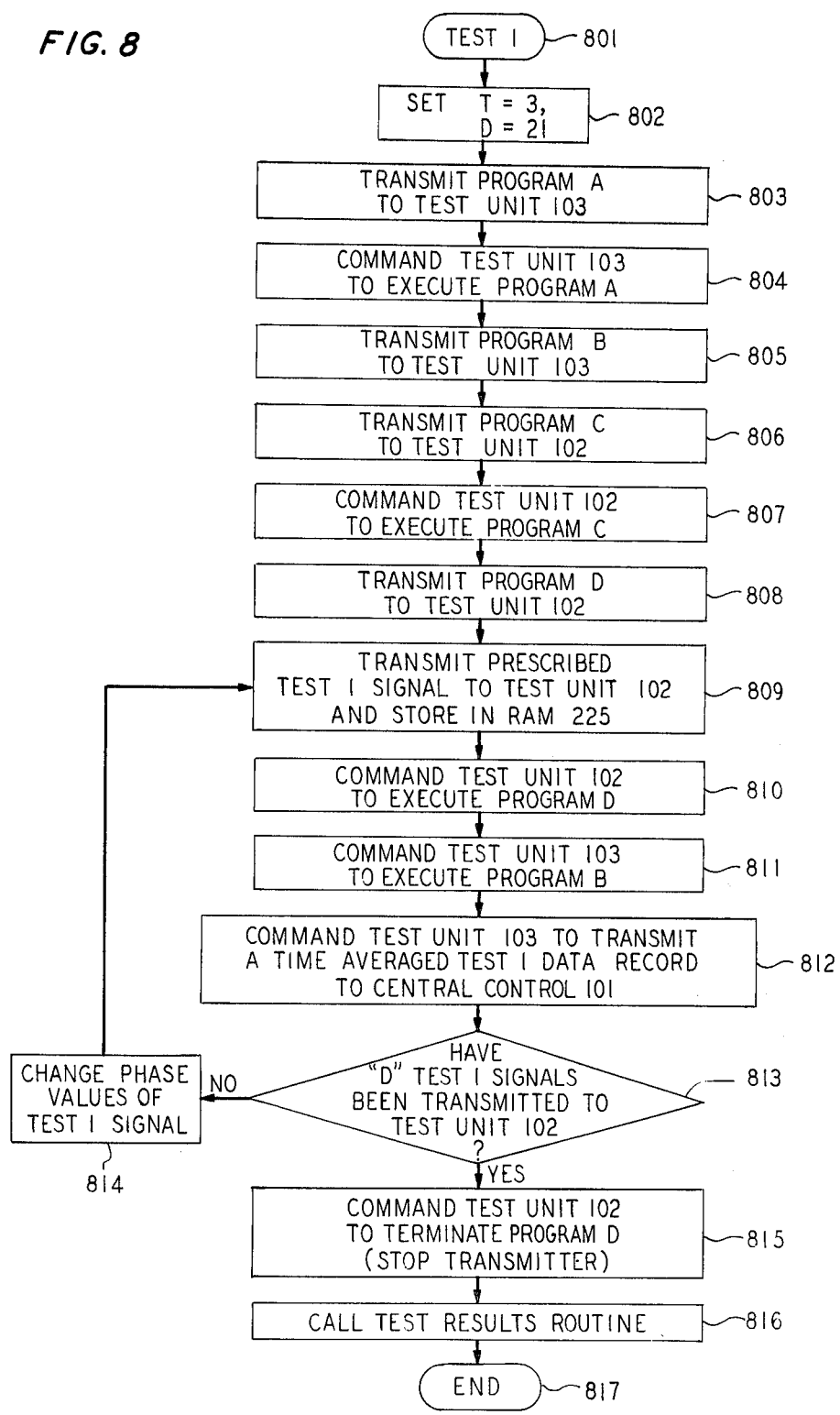
FIG. 8 is a flowchart of a procedure used to obtain the transmission parameter measurements using Test 1 of the procedure of FIG. 4.

Conditional branch point 412 tests to determine whether the number of test signals D is equal to or greater than a predetermined maximum number, in this example 21. If the test result is "yes", control is transferred to operational block 413. Operational block 413 effects a so-called worst case test routine, namely, Test 1, in gathering data to obtain the desired transmission parameter measurements, e.g., frequency response and/or envelope delay distortion on network or facility 105. Test 1 procedure is shown in FIG. 8 and is substantially identical to the worst case test procedure described in our copending application, Ser. No. 107,787 (Favin et al. 20-3-4). If the test result is "no", the number of test signals needed is less than 21 and control is transferred to operational block 414.

Operational block 414 controls the system of FIG. 1 to determine the total number (M) of required data records (measurements) in order to minimize any inaccuracies in the measurements of the desired transmission parameters caused by noise. Typically, this is achieved by storing the information graphically represented in FIG. 6 in memory and using a simple look-up table routine. The total number of required data records (M) is rounded up to the next integer value.

Operational block 415 controls the system of FIG. 1 to determine the maximum number (T) of successive data records that can be time-averaged in order to obtain a desired accuracy in the presence of the measured frequency shift value. Typically, this is achieved by storing the information graphically represented in FIG. 7 in memory and using a simple look-up table routine. The number of successive data records (T) is rounded up to the next integer.

Figure 9:
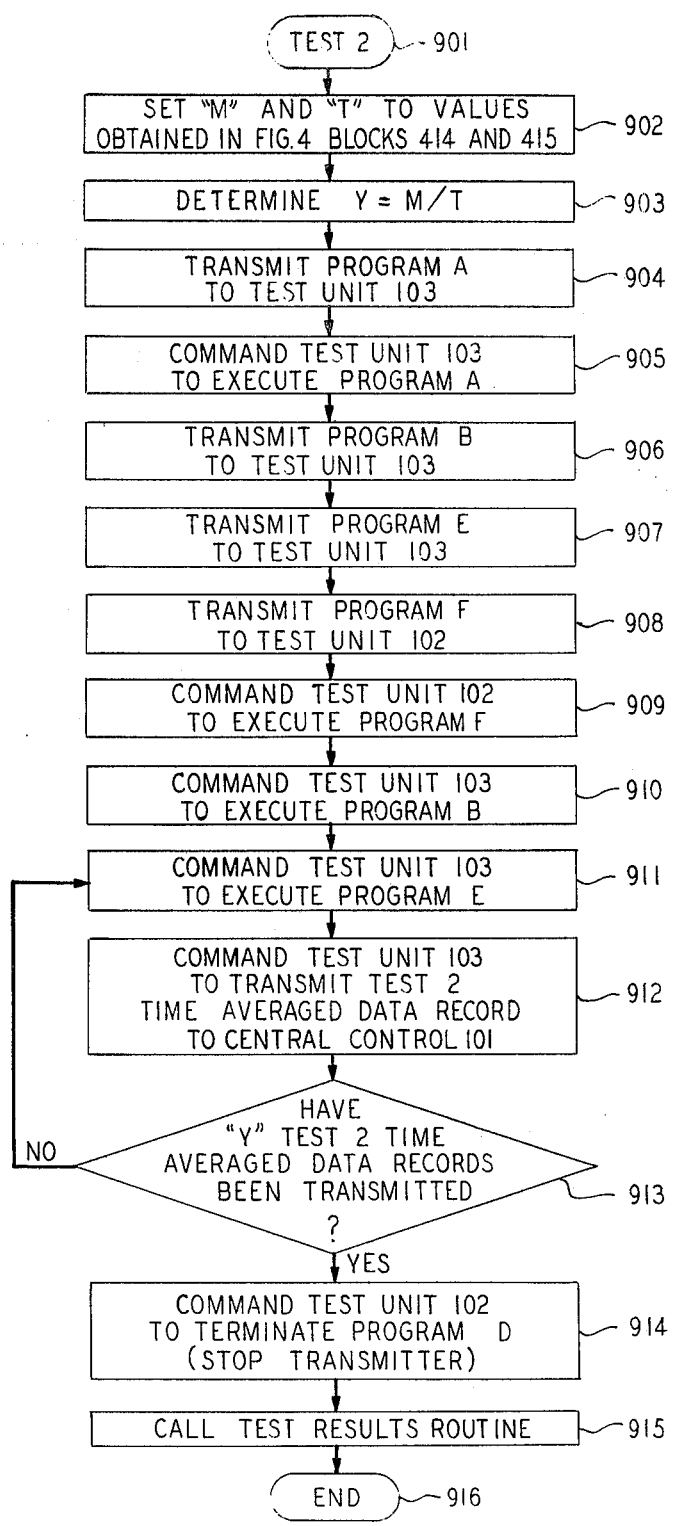
FIG. 9 is a flowchart of a procedure used to obtain the transmission parameter measurements using Test 2 of the procedure of FIG. 4.
Figure 10:
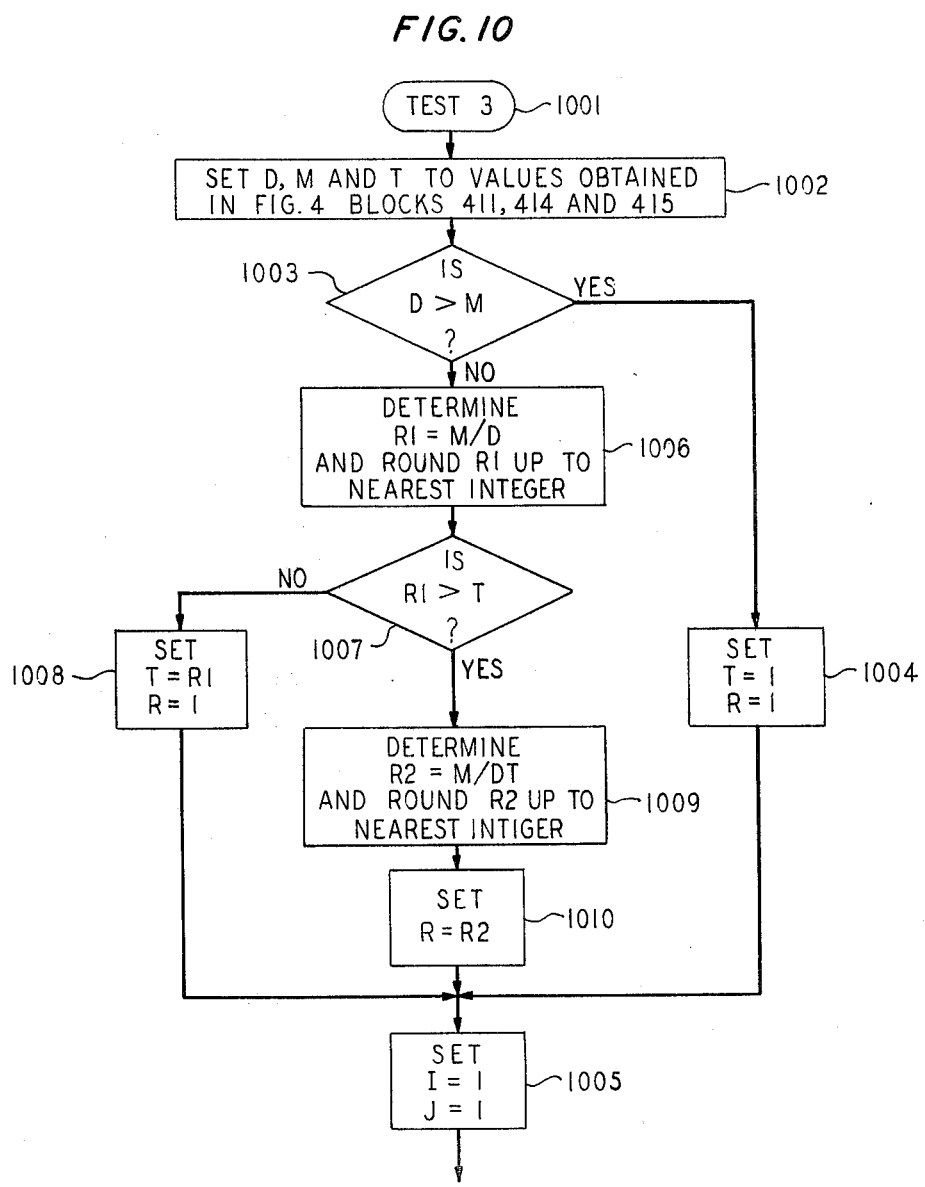
FIGS. 10 and 11 when assembled as shown in FIG. 12 form a flowchart of a procedure used to obtain the desired transmission parameter measurements using Test 3 of the procedure of FIG. 4.
Figure 11:
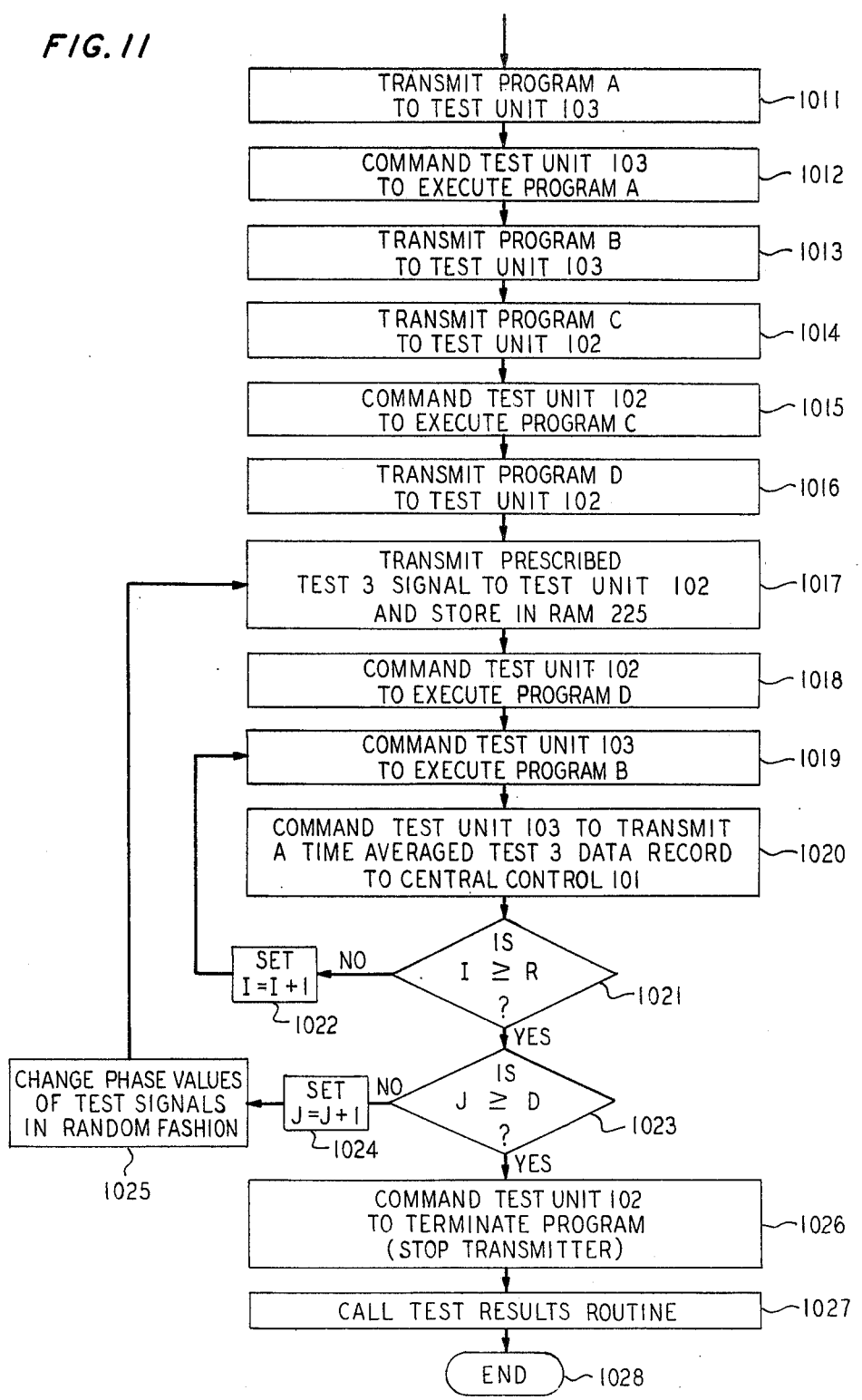

Conditional branch point 416 tests to determine whether the number of test signals (D) to be transmitted over facility 105 in obtaining data to be utilized in generating measurements of the desired transmission parameters is greater than a predetermined minimum number, in the example one (1). If the test reult is "no", control is transferred to operational block 417 and Test 2 procedure as shown in FIG. 9 is used as discussed below. If the test result is "yes", the number of test signals (D) to be transmitted is greater than 1 but less than 21 and applicants' unique resource utilization routine is used, namely, Test 3, as shown in FIGS. 10 and 11, and described below.

Thus, applicants in their unique test procedure dynamically determine the test parameter, i.e., number of test signals D between maximum and minimum numbers, total number M of mesurements (data records) required and maximum number T of successive measurements in a set to be time-averaged in light of the impairments on the facility in order to realize a desired measurement accuracy. To this end, the worst case Test 1 procedure is employed if D is equal to or greater than the maximum of 21, Test 2 is used when D is less than or equal to the minimum of 1 and Test 3 is used when D is greater than the minimum of 1 and less than the maximum of 21. In this manner, optimum system efficiency is realized while obtaining the desired accuracy.

By way of example, the following commands are sent from central control 101 to test units 102 and 103 to effect straightaway testing of facility 105 for frequency response and envelope delay distortion. Again, it is noted that the same test signal is used for frequency response and envelope delay distortion measurements. The test results are employed as described below to obtain measurements of frequency response and envelope delay distortion. Either of test units 102 or 103 may be employed as a transmitter or receiver. In this example, test unit 102 is employed as a transmitter and test unit 103 is employed as a receiver.

Commands for obtaining the envelope delay distortion test and frequency response measurements, i.e., data records, and an explanation are as follows for Test 1:

| COMMANDS | EXPLANATION |
|---|---|
| Ⓐ | START I/O |
| XR | TEST UNIT 103 ADDRESS |
| 7A | TRANSMIT PROGRAM A |
| LX | |
| F@ | PROGRAM A |
| IO | |
| E | END STRING |
| 8A | EXECUTE PROGRAM A |
| 7B | TRANSMIT PROGRAM B |
| A | |
|  | PROGRAM B |
| SC | |
| E | END STRING |
| Ⓐ | START I/O |
| XT | TEST UNIT 102 ADDRESS |
| 7C | TRANSMIT PROGRAM C |
| LX | |
|  | PROGRAM C |
| OX | |
| E | END STRING |
| 8C | EXECUTIVE PROGRAM C |
| 7D | TRANSMIT PROGRAM D |
| W@ | |
|  | PROGRAM D |
| G@ | |
| E | END STRING |
| * Ⓐ | START I/O |
| XT | TEST UNIT 102 ADDRESS |
| 6@ | LOAD RAM 225 FROM MODEM |
| 8D | EXECUTE PROGRAM D |
| Ⓐ | START I/O |
| XR | TEST UNIT 103 ADDRESS |
| 8B | EXECUTE PROGRAM B |
| *2 | TRANSMIT RECORD |
| Ⓐ | START I/O |
| XT | TEST UNIT 102 ADDRESS |
| 3 | STOP TRANSMITTER |

Steps between asterisks (*) are repeated for each additional data record collected.

It will be apparent to those skilled in the art how to generate similar commands for Tests 2 and 3 and that each of test units 102 and 103 communicates reception of valid commands and its status to central control 101.

FIGS. 8 through 17 show flowcharts of program routines for Tests 1, 2 and 3 including steps performed in gathering data to be used in generating measurements of transmission parameters, e.g., frequency response and envelope delay distortion employing a 21-tone signal. The program of FIG. 8 is essentially the commands set out above, which are stored in RAM 303 of control unit 201 in test unit 102 or test unit 103. Again, similar commands are employed to obtain the data as set out in the programs of FIGS. 9, 10 and 11 for Tests 2 and 3.

Consequently, test units 102 and 103 are configured into transmitting and receiving units to effect the desired measurements. It will be apparent to those skilled in the art from the above information how to generate appropriate program listings for the data gathering routines, (see, for example, listings in now U.S. Pat. No. 4,301,536.

As shown in FIG. 8, Test 1 data acquisition procedure and Test results routine is entered via oval 801.

Operational block 802 causes central control 101 to set the number of successive measurements, i.e., data records to T=3 and number of test signals to D=21.

Operational block 803 causes central control 101 to transmit program A, as set out above, to test unit 103. Program A includes a string of commands, as set out above, for setting line configuration unit 202 to a desired impedance, i.e., 600 ohms or 900 ohms; input attenuator 203 to a prescribed mid-range value; and line filter 204 to a specific filter configuration as set above.

Operational block 804 causes central control 101 to transmit a command to test unit 103, instructing it to execute program A. Thus, the receiver input characteristics are set.

Operational block 805 causes control 101 to transmit program B, as set out above, to test unit 103. Program B controls auto-ranging of input attenuator 203 to optimize the incoming signal level to the maximum level allowable without overloading ADC 207. Additionally, program B causes control unit 201 to obtain three successive measurements, i.e., data records of the incoming Test 1 signal and time-average them. That is to say, number T of data records to be time-averaged, in this example is 3.

Operational block 806 causes central control 101 to transmit program C, as set out above, to test unit 102. Program C controls setting of line configuration unit 211 to a specific impedance similar to that of line configuration unit 202.

Operational block 807 causes central control 101 to transmit a command to test unit 102, instructing it to execute program C.

Operational block 808 causes central control 101 to transmit program D, as set out above, to test unit 102. Program D controls selecting a test signal stored in RAM 225 and controls DAC 208 to continuously generate that signal.

Operational block 809 causes central control 101 to transmit applicants' unique 21-tone test signal, as described above, to test unit 102 and to store digital representations of that signal in RAM 225.

Operational block 810 causes central control 101 to transmit a command to test unit 102, instructing it to execute program D and, then, the 21-tone test signal stored in RAM 225 is supplied via DAC 208, low pass filter 209 output attenuator 210, line configuration unit 211 and the output port of DAU 121 to facility under evaluation 105.

Operational block 811 causes central control 101 to transmit a command to test unit 103 instructing it to execute program B, thereby obtaining a set of three consecutive 512 twelve-bit data records of the incoming Test 1 signal which are time-averaged.

Operational block 812 causes central control 101 to transmit a command to test unit 103, instructing it to transmit a time-averaged Test 1 data record to central control 101.

Conditional branch point 813 tests to determine whether D Test 1 signals have been transmitted to test unit 102. In this example, D=21. If the test result is "yes", control is transferred to operational block 815. However, if the test result is "no", control is transferred to operational block 814, which causes the phase values assigned to the individual tones in the Test 1 signal to be rotated in counterclockwise, circular fashion, as described above. Thereafter, control is transferred to operational block 809 and the steps of operational blocks 809 through 812, conditional branch point 813 and operational block 814 are iterated until the test is conditional branch point 813 yields a "yes" result. That is to say, an ensemble of 21 time-averaged data records corresponding to the 21 test signals in Test 1 are transmitted to central control 101.

Operational block 815 causes central control 101 to transmit a command to test unit 102 to terminate program D, that is to say, stop transmitting test signals.

Figure 14:
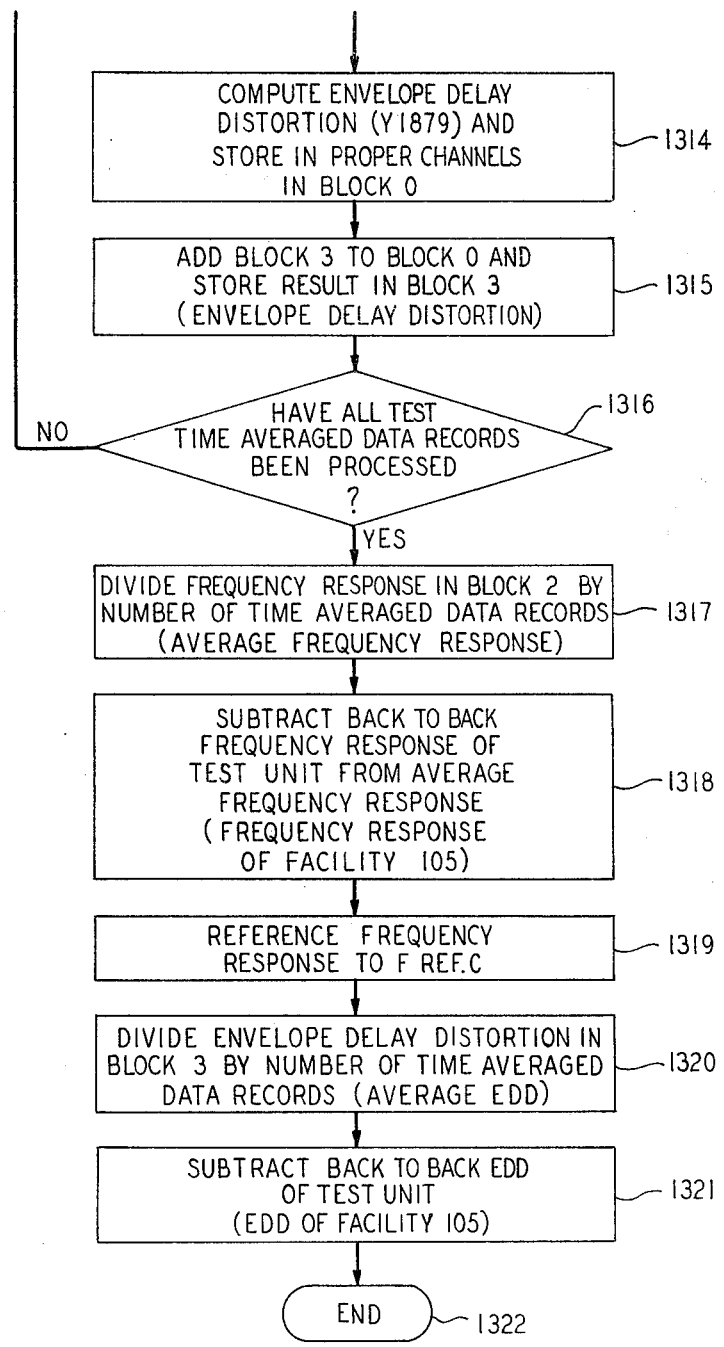

Operational block 816 calls the test results routine of FIG. 13 and 14 to generate the measurement results of, for example, envelope delay distortion and frequency response.

Test 1 is ended via oval 817.

As shown in FIG. 9, Test 2 data acquisition procedure and test results routine is entered via oval 901. Since, as has already been determined, D=1 and one 21-tone test signal is employed.

Operational block 902 causes central control 101 to set T and M to values obtained in FIG. 4 blocks 414 and 415, respectively. By way of example only, assume T=16 and M=96.

Operational block 903 causes central control 101 to compute Y=M/T to obtain the number (Y) of time-averages of T consecutive data records that are to be transmitted to control 101. Thus, in accordance with an aspect of the invention, the Test 2 procedure has been optimized to make the most efficient use of the test system of FIG. 1 while still maintaining a desired accuracy of the desired transmission parameter measurements in light of the impairments on facility 105 as determined in the procedure of FIG. 4.

Operational block 904 causes central control 101 to transmit program A to test unit 103. Program A includes a string of commands, as set out above, for setting line configuration unit 202 to a desired impedance, i.e., 600 ohms or 900 ohms; input attenuator 203 to a prescribed mid-range value; and line filter 204 to a specific filter configuration.

Operational block 905 causes central control 101 to transmit a command to test unit 103, instructing it to execute program A. Thus, the receiver input characteristics are set.

Operational block 906 causes central control 101 to transmit program B to test unit 103. Program B controls auto-ranging of input attenuator 203 to optimize the incoming signal level to the maximum allowed level without overloading ADC 207.

Operational block 907 causes central control 101 to transmit program E to test unit 103. Program E controls ADC 207 to take T 512 twelve-bit samples, i.e., T data records of the received signal. In this example T=16.

Operational block 908 causes central control 101 to transmit program F to test unit 102. Program F controls setting of line configuration unit 211 to a specific impedance similar to that of line configuration unit 202; sets output attenuator 210 to a specific value; selects a 21-tone signal in test signal storage and select unit 220 stored in digital form in PROM 224; and controls DAC 208 to continuously generate the 21-tone digital information stored in PROM 224.

Operational block 909 causes central control 101 to transmit a command to test unit 102, instructing it to execute program F and, then, the 21-tone test signal is supplied via the output port of DAU 121 to facility 105.

Operational block 910 causes central control 101 to transmit a command to test unit 103, instructing it to execute program B.

Operational block 911 causes central control 101 to transmit a command to test unit 103, instructing it to execute program E. Thus, test unit 103 is obtaining a set of T successive data records (measurements) of the received 21-tone test signal, in this example, the number (T) of records is 16.

Operational block 912 causes central control 101 to transmit a command to test unit 103, instructing it to transmit Test 2 time-averaged data record to central control 101.

Conditional branch point 913 tests to determine whether an ensemble of Y Test 2 time-averaged data records has been transmitted. The ensemble number (Y) of time-averaged records utilized in a particular test is dynamically determined in accordance with an aspect of the invention to obtain a desired overall accuracy of measurement between successive measurement results; in this example from experimental practice, it is desired to have a maximum variation for all system errors ±10 microseconds for envelope delay distortion and ±0.1 dB for frequency response. In this example, for Test 2 testing, Y=6, as dynamically determined for the impairment measurements. If the test result is "no", control is transferred to operational block 911, and the operations of blocks 911 and 912 are iterated until conditional branch point 913 yields a "yes" test result.

Operational block 914 causes central control 101 to transmit a command to test unit 102, instructing it to terminate program F, i.e., to stop transmitting the 21-tone test signal.

Operational block 915 calls the test results routine of FIGS. 13 and 14 to generate the measurement results, e.g., envelope delay distortion and frequency response.

Test 2 is ended via oval 916.

FIGS. 10 and 11 when assembled as shown in FIG. 12 form a flowchart of the Test 3 program which further optimizes test system efficiency, in accordance with an aspect of the invention, for measurements to be made when the number of test signals (D) is greater than 1 and less than 21.

As shown, the Test 3 procedure is entered via oval 1001.

Operational block 1002 sets the number of test signals (D), the total number of required data records (M), and the maximum number of successive data records to be taken (T) to be time-averaged to the values dynamically obtained as shown in FIG. 4 blocks 411, 414 and 415, respectively.

Conditional branch point 1003 tests to determine whether the number of test signals (D) is greater than the required total number of data records (M). If the test result is "yes", control is transferred to operational block 1004 and the number of successive data samples (T) to be taken is set to 1 and a so-called repeat factor (R) is set to 1. This procedure is the worst case for Test 3 because of the time required to transmit test signals (D) from central control 101 to test unit 103. However, this worst case procedure is still dynamically optimized for the impairments on facility 105 to obtain a desired measurement accuracy as discussed above and, still, is more efficient than the prior Test 1 procedure. Since the number of test signals (D) is greater than the number of required time-averages (M), time averaging is not needed and only one data record is taken for each test signal employed. Again, all of these conditions are dynamically determined in accordance with the invention. Once T and R are set equal to 1, control is transferred to operational block 1005. If the test result of conditional branch point 1003 is "no", the number of test signals required is less than M and control is transferred to operational block 1006.

Operational block 1006 causes central control 101 to generate a value for test factor R1, namely, R1=M/D where $1 < D < M$. The value of R1 is then rounded up to the nearest integer. The test factor is employed so that a desired number of data records to be time averaged and that the ensemble of time-averaged data records includes an appropriate number of time-averaged data records in obtaining the transmission parameter measurements while minimizing the number of test signals to be transmitted from central control 101 to test unit 102. As indicated above, the transmission of test signals from central control 101 requires significantly greater time than the taking of time-averages. Thus, by utilizing a test factor, the time required for making a measurement is optimized in accordance with the invention.

Conditional branch point 1007 tests to determine whether test factor R1 is greater than the maximum number of successive data records to be taken (T). This is a further optimization of the test procedure to obtain the desired accuracy in the presence of the impairments on facility 105. If the test result is "no", control is transferred to operational block 1008 and T is set equal to test factor R1 and repeat factor R is set to 1. This operation determines the number of successive data records in a set to be time-averaged. Thereafter, control is transferred to operational block 1005. If the test result of conditional branch point 1007 is "yes", control is transferred to operational block 1009.

Operational block 1009 causes central control 101 to determine R2=M/DT. The value of R2 is rounded up to the nearest integer. Again, this operation generates a value for repeat factor R for further optimizing the time required to obtain the desired transmission parameter measurements. Again, use of repeat factor R is important because it minimizes the number of test signals that have to be transmitted from central control 101 to test unit 102. As indicated above, it takes significantly less time to generate a time-averaged set of measurements than to transmit a new test signal from central control 101.

Operational block 1010 causes central control 101 to set repeat factor R to the value of R2. Thereafter, control is transferred to operational block 1005.

Operational block 1005 causes central control 101 to set indexes I and J equal to 1.

Operational blocks 1011 through 1020 are substantially identical to operational blocks 803 through 812 of FIG. 8, described above. A difference is operational block 1013, the number T of data records in a set to be time-averaged is dynamically determined in accordance with an aspect of the invention as described above. Consequently, T is set in Program B to either the value determined in FIG. 4 operational block 415, the value determined via block 1006, branch point 1007 and block 1008, namely, T=R1, or T=1 determined by a branch point 1003 and block 1004.

Conditional branch point 1021 tests to determine whether $I \geq R$, that is, whether the number of time-averages of the test signal has been repeated the appropriate number of times, namely R times. If the test result is "no", control is transferred to operational block 1022 and Index I is incremented. Thereafter, control is transferred to operational block 1019 and another time-averaged set of measurements is generated. Steps 1019 through 1022 are iterated until conditional branch point 1021 yields a "yes" result and the desired number of time-averaged sets of data records has been generated.

Conditional branch point 1023 tests to determine whether $J \geq D$, that is, whether the number of dynamically determined test signals for optimizing the test procedure has been utilized. If the test result is "no", control is transferred to operational block 1024, index J is incremented and control is transferred to operational block 1025. Operational block 1025 causes central control 101 to change the phase values of the tones in the test signal in a random fashion. Specifically, each time a new test signal is transmitted from central control 101 to test unit 102, phase values associated with the tones are essentially scrambled in a random fashion, rather than rotating them in a fixed fashion as in the Test 1 procedure. This gives better test results since the number of test signals D is greater than 1 and less than 21 and each tone cannot take on all of the phase component values as in Test 1. Once the phase values have been changed control is transferred to operational block 1017, the new test signal is transmitted to test unit 102 and steps 1017 through 1025 are repeated until conditional branch point 1023 yields a "yes" result and control is transferred to operational block 1026.

Operational block 1026 causes central control 101 to transmit a command to test unit 102 to terminate Program D, that is to stop transmitting the test signal.

Operational block 1027 causes computer 110 to call the test results routine of FIGS. 13 and 14 for generating measurements of the desired transmission parameters, e.g., envelope delay distortion and/or frequency responses.

Test 3 is ended via oval 1028.

The test results routine, i.e., the frequency response and envelope delay distortion program and, hence, operation of computer 110 for obtaining measurements of frequency response and envelope delay distortion are more readily understood with the aid of the flowchart shown in FIGS. 13 and 14 when connected as shown in FIG. 15. It should be noted that the steps in computing the frequency response and envelope delay distortion are identical for all three tests; however, the data employed in each of those procedures is different, as described above. Accordingly, the program routine is entered via oval 1300. Thereafter, control is transferred to operational block 1301.

Operational block 1301 operates to clear blocks 2 and 3 in core memory of computer 110.

Operational block 1302 causes computer 110 to load a test data record, e.g., either Test 1, 2 or 3 data records into block $\phi$ in core memory.

Operational block 1303 causes computer 110 to Hann the data in block 3 of core memory. As indicated above, this function minimizes the effects of so-called leakage in the data.

Operational block 1304 causes computer 110 to transform the data in block φ from the time domain into the frequency domain, i.e., Fourier transforms it.

Operational block 1305 causes each tone in the frequency domain data to be multiplied by the complex conjugate of the tone at reference frequency A (F REF.A). In this example, reference frequency A corresponds to channel 123 or 1921.875 Hz.

Operational block 1306 causes the data in block φ to be multiplied by a comb filter function to filter out everything except the individual test frequency components.

Operational block 1307 causes the resulting data record to be stored in block φ and 1 of core memory.

Operational block 1308 causes the data in block φ to be multiplied by its complex conjugate to obtain a power spectrum for frequency response.

Operational block 1309 causes the data in block 2 to be added to the data in block φ and to store the result in block 2. (This is a running value of the frequency response spectrum).

Operational block 1310 causes the phase values of the transmitted test signal to be subtracted from the tones represented by the data stored in block 1.

Operational block 1311 causes computer 110 to compute the phase difference values of adjacent tones in the test signal, i.e., the difference between T1 and T2, T2 and T3 . . . T(N−1)−TN, where, in the example, N=21. Thus, 20 phase difference values are computed.

Operational block 1312 causes computer 110 to reference the phase difference values computed above to the phase difference value at reference frequency B (F REF.B). In this example, reference frequency B is in channel 118 or 1843.75 Hz. It should be noted that this is a mere convenience, and the envelope delay distortion to be computed from the phase difference values can be referenced to any desired frequency. It is the practice to reference it to the frequency at which the minimum envelope delay distortion is found. This ensures that all subsequent measurements are positive values.

Operational block 1313 causes the values in rectangular coordinates to be converted to polar coordinates. This is important to obtain both magnitude and phase values of the phase difference values. The magnitude values are not utilized; however, the phase values represent the normalized phase difference values needed to compute envelope delay distortion.

Figure 16:
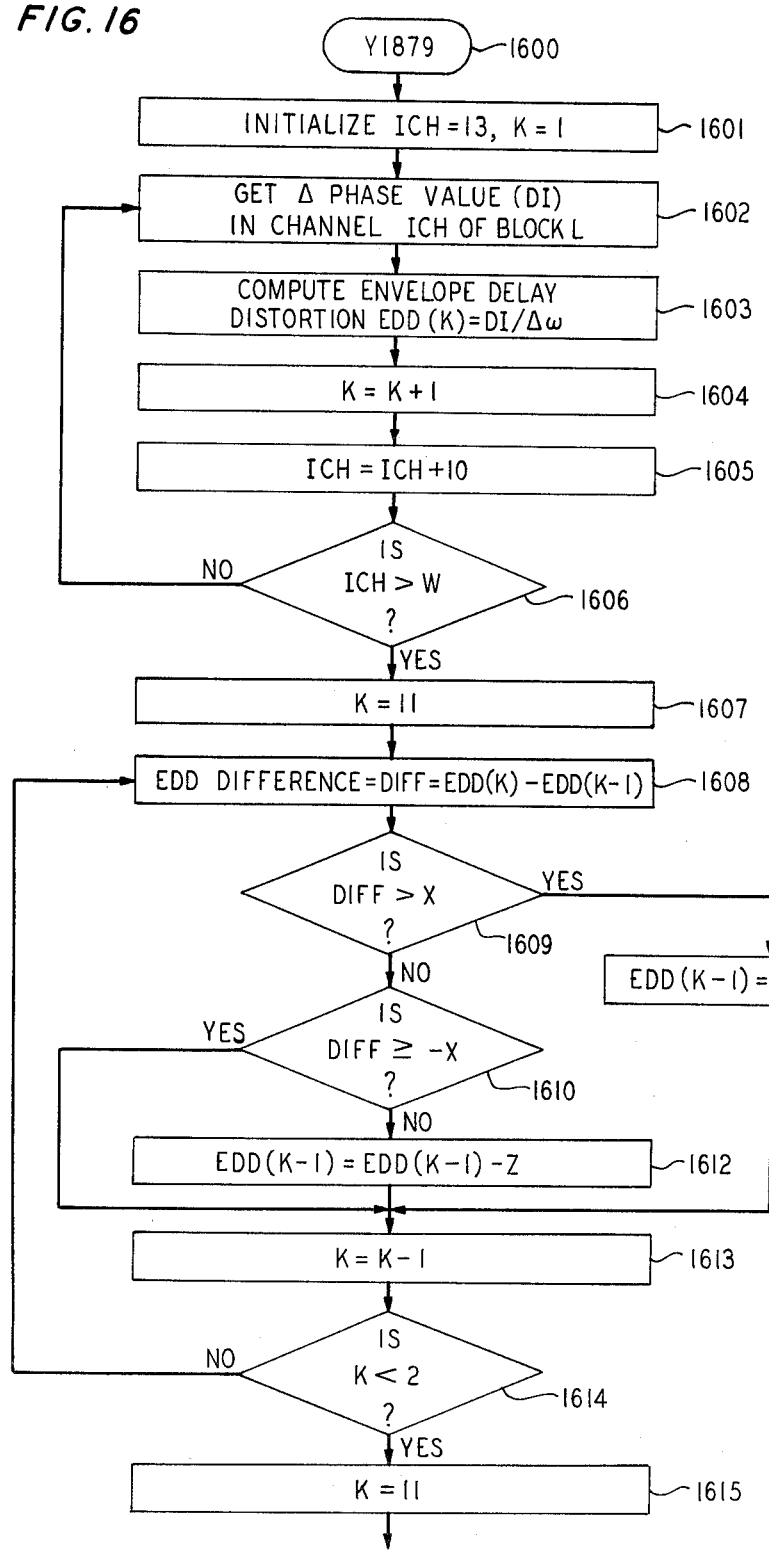
FIGS. 16 and 17 when connected as shown in FIG. 18 is a flowchart of a procedure for computing values of envelope delay distortion used in the procedure of FIGS. 13 and 14.
Figure 17:
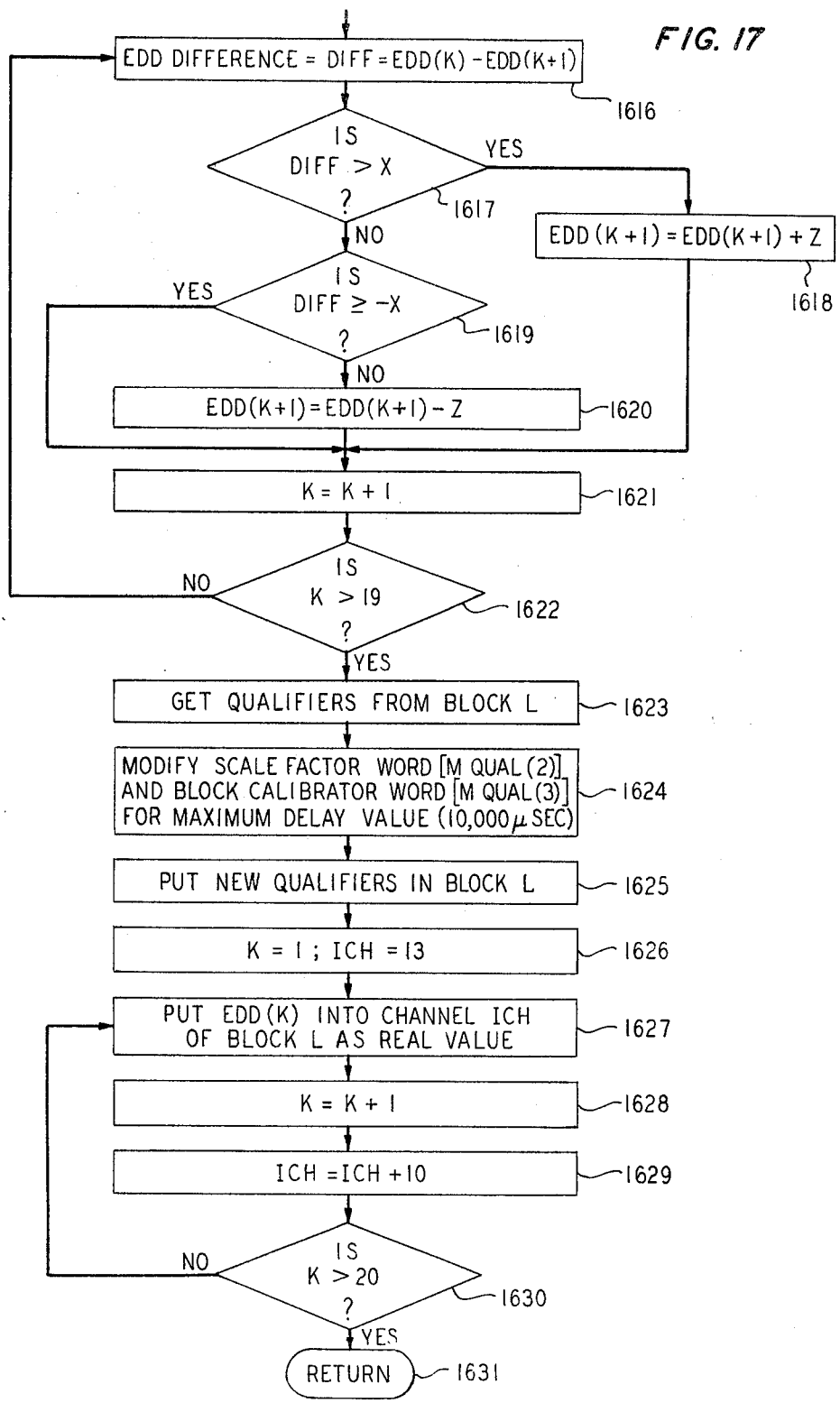

Operational block 1314 causes computer 110 to compute a value for envelope delay distortion by calling subroutine Y1879 (FIGS. 16 and 17). The computed values are thereafter stored in proper channels in block φ.

Operational block 1315 causes the data in block 3 to be added to block φ and the result to be stored in block 3. This is the running value of envelope delay distortion.

Conditional branch point 1316 tests to determine whether all test time-averaged data records have been processed. As described above, the number of time-averaged data records have been dynamically optimized to a value to obtain the desired transmission parameter measurement accuracy in the presence of the measured impairments on facility 105.

Operational block 1317 causes the data in block 2 to be divided by the number of time-averaged data records to obtain the average frequency response value.

Operational block 1318 causes computer 110 to subtract so-called back-to-back frequency response determined above. Back-to-back frequency response is obtained for each test unit by merely connecting the transmit and receive channels in data acquisition unit 121 (FIG. 2), by circuitry not shown, to obtain a value of the frequency response of the data acquisition unit. That is to say, the output of data acquisition unit 121 is connected to its input frequency response measured as described above. This operation results in obtaining a value of frequency response of facility 105 only, i.e., the frequency reponse componenton attributable to the transmit and receive paths of the data acquisition units is subtracted from the measured value.

Operational block 1319 causes computer 110 to reference the frequency response of facility 105 to reference frequency C (F REF.C), in this example, the signal in channel 63 or 984.375 Hz.

Operational block 1320 causes the data in block 3 to be divided by the number of time-averaged data records to obtain an average envelope delay distortion value.

Operational block 1321 causes computer 110 to subtract the so-called back-to-back envelope delay distortion value of the test units from the measured value to obtain a value of envelope delay distortion of facility 106. Again, the back-to-back envelope delay distortion of the test unit is obtained by connecting the output of the data acquisition unit to its input and measuring envelope delay distortion as described above.

The frequency response and envelope delay distortion routine is ended via oval 1322.

Briefly, the Y1879 subroutine used in block 1314 corrects the transitions that result from the Fourier analyzer routines in normalizing the phase difference values to the range −180 to +180 degrees. Since the Fourier analyzer routines are restricted to this phase difference range and since envelope delay distortion can be greater than 360 degrees, each instance of an envelope delay distortion value being outside the −180 to +180 degree range causes a transition which must be corrected to obtain a smooth transition from value to value. The corrections are valid as long as the envelope delay distortion values between adjacent tone frequencies do not differ by more than a predetermined delay value, in this example, 3200 microseconds or 180 degrees of phase difference.

Figure 18:
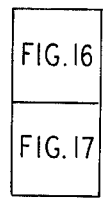

The phase difference correction procedure of computational program Y1879, and hence, operation of computer 110 for obtaining a corrected value for envelope delay distortion in microseconds, is more readily understood with the aid of the flowchart shown in FIGS. 16 and 17 when connected as shown in FIG. 18. Accordingly, the Y1879 subroutine is entered via oval 1600. Thereafter, control is transferred to operational block 1601.

Operational block 1601 initializes the routine to a predetermined channel for obtaining a first phase difference value, in this example, channel 13, and for setting a index, i.e., K=1.

Operational block 1602 calls to "get" a Δ phase value (DI) in the first channel of block L in core memory.

Operational block 1603 computes a value for envelope delay distortion in accordance with $EDD(K) = DI/\Delta\omega,$ where EDD(K) is the envelope delay distortion value, DI is the Δ phase value in the particular tone channel and Δω is the frequency difference between adjacent tone frequencies converted to degrees per second, in this example, equals 56,250 degrees/second.

Operational block 1604 causes the index to be updated, i.e., K=K+1.

Operational block 1605 causes the channel to be updated in which a phase difference value is to be obtained, i.e., ICH=ICH+10. An indexing by 10 channels is used because the phase difference values, in this example, are spaced every tenth channel. The channel indexing is selected to meet established standards in the industry, in this example, equivalent to an aperture frequency of 156.25 Hz.

Conditional branch point 1606 tests to determine if the channel value is greater than a predetermined channel number W, where W in this example is the highest anticipated channel where a phase difference value is to be obtained, namely, channel 203. If the test result is "yes", control is transferred to operational block 1607. If the test result is "no", control is returned to operational block 1602, and the steps in 1602 through 1606 are iterated until a "yes" result is obtained. That is to say, envelope delay distortion values are computed for each channel having a phase difference value.

Operational block 1607 sets index K to a predetermined value, in this example, to 11. This value is the phase difference value to which all the phase difference values have been previously normalized to.

Operational block 1608 causes the envelope delay distortion difference (DIFF) to be obtained between a predetermined one of the 20 values utilized in this example, and the next lower envelope delay distortion value, in this example, beginning with envelope delay distortion value corresponding to K=11.

Conditional branch point 1609 tests to determine if the envelope delay distortion difference (DIFF) is greater than a predetermined value X, where X, in this example, is the maximum allowable envelope delay distortion between adjacent tone frequencies and is equal to 3200 microseconds. If the test result is "no", control is transferred to conditional branch point 1610. The "no" test result in conditional branch point 1609 indicates that there was no transition in the normalization process. However, if the test result is "yes", control is transferred to operational block 1611. When a "yes" test result occurs, this indicates that there was a negative transition in the Fourier analyzer normalization process of either 360 degrees or 6400 microseconds of envelope delay.

Operational block 1611 corrects for the negative transition by adding (Z), i.e., 360 degrees or 6400 microseconds of envelope delay to the envelope delay value (K−1). Thereafter, control is transferred to operational block 1613.

Conditional branch point 1610 tests to determine if the envelope delay distortion difference (DIFF) is equal to or greater than −X, where X is the maximum allowable envelope delay distortion difference between adjacent tone frequencies, again, 3200 microseconds. A "yes" test result indicates that there is no transition in the normalization process and control is transferred to operational block 1613. However, a "no" test result indicates that the difference in the normalization process is greater than the maximum allowable and that there was a positive transition, which must be corrected for, and control is transferred to operational block 1612.

Operational block 1612 corrects the envelope delay distortion (K−1) value by subtracting (Z), in this example, 360 degrees or 6400 microseconds from that value.

Operational block 1613 decrements index K by 1, i.e., K=K−1.

Conditional branch point 1614 tests to determine if K is less than 2 to determine if the envelope delay distortion values from K=11 through K=1 have been employed. If the test result is "yes", control is transferred to operational block 1615. However, if the test result is "no", control is returned to operational block 1608, and steps 1608 through 1614 are repeated until the lowest envelope delay distortion value has been reached, i.e., K=1.

Steps 1607 through 1614 correct the envelope delay distortion values from the mid-value, namely, K=11, through the lowest value, K=1, for transitions in the Fourier analyzer normalizing process. Steps 1615 through 1622 effect the same correction for the envelope delay distortion values from K=11 through K=20 and, therefore, a detailed description is deemed not necessary. Once the highest envelope delay distortion value, i.e., K=20, has been corrected as tested for in conditional branch point 1622, control is transferred to operational block 1623.

Operational blocks 1623 through 1625 merely assure that the computed envelope delay distortion values are presented in the memory block L to be within ±10,000 microseconds full-scale value for the Fourier analyzer display unit.

Operational block 1626 re-initializes the system to the previous initial conditions, i.e., K=1 and ICH=13.

Operational block 1627 puts the corrected envelope delay distortion values, i.e., envelope delay distortion (K), where K=1 through 20, into the appropriate channels of block L as real values.

Operational block 1628 increments the envelope delay distortion number, i.e., K=K+1.

Operational block 1629 increments the channel number, i.e., ICH=ICH+10.

Conditional branch point 1630 tests to determine if all the envelope delay distortion values have been put into their appropriate channels, namely, is K greater than 20. If the test result is "no", control is returned to operational block 1627 and steps 1627 through 1630 are repeated until a "yes" test result is obtained. Upon obtaining a "yes" test result, control is returned to the test program via oval 1631.

Although the example utilized in the above-described arrangements pertains to the voice frequency band, the invention is equally applicable to any other frequency band of interest.

What is claimed is:

1. A method for generating a measurement of at least one prescribed transmission parameter of a network or facility under evaluation, comprising the steps of,
   generating measurements of prescribed impairments on the network or facility under evaluation,
   utilizing said impairment measurements in accordance with predetermined relationships to dynamically determine test parameters including a number of test signals in a set of test signals to be generated, a required total number of measurements, a maximum number of consecutive measurements in each set of consecutive measurements to be time-averaged, and a number of time-averaged sets of measurements in an ensemble to be obtained, generating said set of test signals, each test signal having a plurality of tones, and each tone having predetermined amplitude, frequency and unique phase component values determined in accordance with a prescribed criterion, transmitting said set of test signals over said network or facility under evaluation, making said number of sets of consecutive measurements of a received version of each test signal in said set of test signals, time averaging the measurements in each individual set of said sets of measurements, obtaining said ensemble of said time-averaged sets of measurements, and utilizing said ensemble to generate the measurement of the at least one prescribed transmission parameter.

2. The method as defined in claim 1 wherein said prescribed impairments are third order intermodulation distortion, signal-to-noise ratio and frequency shift.

3. The method as defined in claim 2 wherein said predetermined relationships with said impairments are the number (D) of test signals in said set relative to the measured third order intermodulation distortion, number (M) of required measurements in relationship to the measured signal-to-noise ratio, and the maximum number (T) of consecutive measurements in a set in relationship with the measured frequency shift.

4. The method as defined in claim 1 wherein the number of time averages to be generated for each of said test signals is dynamically determined in accordance with predetermined relationships of said test parameters.

5. The method as defined in claim 4 wherein the step of dynamically determining said number of time averages includes, determining whether said number of test signals is greater than said number of required measurements, and if so, setting the number of consecutive measurements in a set to be time averaged and the number of time averages for each test signal to predetermined values.

6. The method as defined in claim 5 wherein said predetermined values equal one.

7. The method as defined in claim 4 wherein said step of dynamically determining said number of time averages for each test signal includes, determining whether said number of test signals is greater than said number of required measurements to be time averaged, if not, determining a test factor in accordance with a prescribed relationship between said number of test signals and said number of required measurements, determining whether said test factor is greater than said maximum number of consecutive measurements, and if not, setting said number of consecutive measurements in each set of measurements to said test factor rounded to an integer and setting said number of time averages for each of said test signals to a predetermined value.

8. The method of claim 7 wherein said test factor is determined in accordance with $R1 = M/D$, where R1 is the test factor rounded up to nearest integer, M is the number of required measurements (data records) per set and D is the number of test signals per set, and wherein said number of time averages for each of said test signals is set to one.

9. The method as defined in claim 4 wherein said step of dynamically determining said number of time averages for each test signal includes, determining whether said number of test signals is greater than said number of required measurements to be time averaged, if not, determining a test factor in accordance with a prescribed relationship between said number of test signals and said number of required measurements, determining whether said test factor is greater than said maximum number of consecutive measurements, and if so, determining a repeat factor which is the number of time-averaged sets of measurements to be made for each test signal in accordance with a prescribed relationship of said test parameters.

10. The method as defined in claim 9 wherein said test factor is determined in accordance with $R1 = M/D$, and said repeat factor is determined in accordance with $R2 = M/DT$, where R1 is said test factor rounded up to a nearest integer, R2 is said repeat factor rounded up to a nearest integer, M is said number of required measurements per measurement set, D is said number of test signals per test signal set and T is said maximum number of consecutive measurements (data records) to be time-averaged.

11. A method for generating a measurement of at least one prescribed transmission parameter of a network or facility under evaluation, comprising the steps of, generating measurements of prescribed impairments on the network of facility under evaluation, utilizing said impairment measurements in accordance with predetermined relationships to dynamically determine test parameters including a number of test signals in a set of test signals to be generated, a required total number of measurements, a maximum number of consecutive measurements in each set of consecutive measurements to be time-averaged, and a number of time-averaged sets of measurements in an ensemble to be obtained, determining whether the number (D) of test signals in said set of test signals is equal to or greater than a maximum (MAX) number, equal to or less than a minimum (MIN) number, or within said maximum (MAX) and minimum (MIN) numbers, selecting a first predetermined test procedure when said number (D) of test signals in said set is equal to or greater than said maximum ($D \geq MAX$), said first test procedure including setting the number of test signals in said set to said maximum number, selecting a second predetermined test procedure when said number (D) of test signals in said set is equal to or less than said minimum ($D \leq MIN$), said second test procedure including setting the number of test signals in said set to said minimum number, selecting a third predetermined test procedure when said number (D) of test signals in said set is within said maximum and minimum numbers, said third test procedure including setting the number of test signals in said set to said number (D), generating said set of test signals, each test signal having a plurality of tones, and each tone having predetermined amplitude, frequency and unique phase component values determined in accordance with a prescribed criterion, transmitting said set of test signals over said network or facility under evaluation, making said number of sets of consecutive measurements of a received version of each test signal in said set of test signals, time averaging the measurements in each individual set of said sets of measurements, obtaining said ensemble of said time-averaged sets of measurements, and utilizing said ensemble to generate the measurement of the at least one prescribed transmission parameter.

12. The method as defined in claim 11 wherein in said second test procedure the number (Y) of time-averaged sets of measurements in said ensemble is dynamically determined in predetermined relationship with said number (M) of required measurements and said maximum number (T) of consecutive measurements.

13. The method as defined in claim 12 wherein said predetermined relationship is Y=M/T, where Y is the number of time-averaged sets, M is the number of required measurements and T is the maximum number of consecutive measurements in a set to be time-averaged.

* * * * *